US008457064B2

(12) United States Patent
Gupta et al.

(10) Patent No.: US 8,457,064 B2
(45) Date of Patent: Jun. 4, 2013

(54) METHODS AND APPARATUS FOR RF HANDOFF IN A MULTI-FREQUENCY NETWORK

(75) Inventors: Binita Gupta, San Diego, CA (US);
Linbo Li, San Diego, CA (US);
Raghuraman Krishnamoorthi, San Diego, CA (US); Ashok Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1210 days.

(21) Appl. No.: 12/051,758

(22) Filed: Mar. 19, 2008

(65) Prior Publication Data
US 2008/0253331 A1    Oct. 16, 2008

Related U.S. Application Data

(60) Provisional application No. 60/896,255, filed on Mar. 21, 2007, provisional application No. 60/945,292, filed on Jun. 20, 2007.

(51) Int. Cl.
*H04W 4/00*    (2009.01)

(52) U.S. Cl.
USPC ........... 370/331; 370/335; 370/337; 370/338; 370/350; 455/423; 455/434; 455/436; 455/450; 455/3.01

(58) Field of Classification Search
USPC ................. 370/331, 335, 337, 338, 341–345, 370/350; 455/436, 450, 41.2, 423, 67.11
See application file for complete search history.

(56) References Cited

U.S. PATENT DOCUMENTS

| 5,203,010 A | * | 4/1993 | Felix et al. ................... 455/438 |
| 5,471,662 A | | 11/1995 | Shiota |
| 5,627,880 A | * | 5/1997 | Rozanski et al. ............. 370/335 |
| 5,745,481 A | * | 4/1998 | Phillips et al. ................ 370/313 |
| 5,784,695 A | | 7/1998 | Upton et al. |

(Continued)

FOREIGN PATENT DOCUMENTS

| EP | 1648097 A2 | 4/2006 |
| EP | 1715711 A1 | 10/2006 |

(Continued)

OTHER PUBLICATIONS

International Search Report—PCT/US08/057938, International Search Authority—European Patent Office, Sep. 11, 2008.

(Continued)

*Primary Examiner* — Sharad Rampuria
(74) *Attorney, Agent, or Firm* — Arent Fox LLP

(57) ABSTRACT

Methods and apparatus for RF handoff in a multi-frequency network. A method includes generating seamless and partially seamless handoff tables for multiplexes carried in a current LOI, wherein the seamless and partially seamless handoff tables comprise neighboring RF channels carrying one or more of the multiplexes in the current LOI, detecting a handoff event initiated by acquisition failures on a current RF, selecting a selected RF channel from the seamless and partially seamless handoff tables, and performing a handoff to the selected RF channel. An apparatus includes processing logic configured to generate the seamless and partially seamless handoff tables, detect a handoff event initiated by acquisition failures on a current RF, and select a selected RF channel from the seamless and partially seamless handoff tables. The apparatus also includes channel switch logic configured to perform a handoff to the selected RF channel.

59 Claims, 13 Drawing Sheets

U.S. PATENT DOCUMENTS

| | | | |
|---|---|---|---|
| 5,787,346 A | 7/1998 | Iseyama | |
| 5,995,834 A | 11/1999 | Moore | |
| 5,995,843 A | 11/1999 | Sjodin et al. | |
| 6,112,085 A | 8/2000 | Garner et al. | |
| 6,195,552 B1 | 2/2001 | Jeong et al. | |
| 6,272,343 B1 | 8/2001 | Pon et al. | |
| 6,490,259 B1 | 12/2002 | Agrawal et al. | |
| 6,675,209 B1 | 1/2004 | Britt | |
| 7,170,905 B1* | 1/2007 | Baum et al. | 370/467 |
| 7,436,903 B2 | 10/2008 | Sandhu et al. | |
| 7,450,546 B2 | 11/2008 | Lee et al. | |
| 7,583,633 B2 | 9/2009 | Woo et al. | |
| 7,654,151 B2 | 2/2010 | Agar et al. | |
| 7,660,275 B2* | 2/2010 | Vijayan et al. | 370/312 |
| 7,738,356 B2 | 6/2010 | Kim | |
| 7,948,907 B2* | 5/2011 | Wang et al. | 370/252 |
| 8,077,801 B2 | 12/2011 | Malladi | |
| 8,108,895 B2* | 1/2012 | Anderson et al. | 725/36 |
| 8,149,748 B2* | 4/2012 | Bata et al. | 370/311 |
| 8,155,649 B2 | 4/2012 | McHenry et al. | |
| 8,189,501 B2* | 5/2012 | Eidenschink et al. | 370/310.2 |
| 2003/0067895 A1 | 4/2003 | Paneth et al. | |
| 2003/0203735 A1 | 10/2003 | Andrus et al. | |
| 2004/0125769 A1 | 7/2004 | Vare | |
| 2004/0203336 A1* | 10/2004 | Sinnarajah et al. | 455/3.01 |
| 2004/0223561 A1 | 11/2004 | Tahat | |
| 2005/0090978 A1 | 4/2005 | Bathory et al. | |
| 2005/0195763 A1 | 9/2005 | Kadous et al. | |
| 2006/0013186 A1 | 1/2006 | Agrawal et al. | |
| 2006/0056344 A1 | 3/2006 | Roy et al. | |
| 2006/0109820 A1 | 5/2006 | Miyata | |
| 2006/0153133 A1 | 7/2006 | Zhong | |
| 2006/0168475 A1 | 7/2006 | Segers et al. | |
| 2006/0250937 A1 | 11/2006 | Wang et al. | |
| 2006/0252420 A1* | 11/2006 | Mantravadi et al. | 455/423 |
| 2007/0064652 A1* | 3/2007 | Xu et al. | 370/331 |
| 2007/0149240 A1 | 6/2007 | Brok | |
| 2007/0156379 A1 | 7/2007 | Kulkarni et al. | |
| 2007/0183444 A1 | 8/2007 | Schoettle | |
| 2007/0189404 A1 | 8/2007 | Baum et al. | |
| 2007/0217383 A1 | 9/2007 | Mitani | |
| 2008/0000306 A1 | 1/2008 | Agar et al. | |
| 2008/0132282 A1 | 6/2008 | Liu et al. | |
| 2008/0198763 A1 | 8/2008 | Fischer et al. | |
| 2008/0247364 A1 | 10/2008 | Kim et al. | |
| 2008/0253287 A1 | 10/2008 | Gupta et al. | |
| 2008/0259894 A1 | 10/2008 | Gupta et al. | |
| 2008/0259911 A1 | 10/2008 | Gupta et al. | |
| 2008/0268844 A1* | 10/2008 | Ma et al. | 455/436 |
| 2009/0005120 A1 | 1/2009 | Ylitalo | |
| 2009/0010225 A1 | 1/2009 | Gupta | |
| 2009/0029705 A1 | 1/2009 | Gupta et al. | |
| 2009/0124210 A1 | 5/2009 | Imai et al. | |
| 2009/0197604 A1 | 8/2009 | Gupta et al. | |
| 2009/0225646 A1 | 9/2009 | Dayal et al. | |
| 2009/0233602 A1 | 9/2009 | Hughes | |
| 2009/0274119 A1 | 11/2009 | Gupta et al. | |
| 2009/0304120 A1 | 12/2009 | Agrawal et al. | |
| 2010/0046445 A1 | 2/2010 | Sawahashi et al. | |
| 2011/0038350 A1 | 2/2011 | Gholmieh et al. | |

FOREIGN PATENT DOCUMENTS

| | | |
|---|---|---|
| EP | 1758410 | 2/2007 |
| EP | 1758423 A1 | 2/2007 |
| EP | 1773006 A1 | 4/2007 |
| JP | 10108267 A | 4/1998 |
| JP | 2004207922 A | 7/2004 |
| JP | 2005524366 A | 8/2005 |
| JP | 2006148836 A | 6/2006 |
| JP | 2006287959 A | 10/2006 |
| JP | 2006333243 A | 12/2006 |
| JP | 2007518380 A | 7/2007 |
| JP | 2008537395 A | 9/2008 |
| JP | 2009527142 A | 7/2009 |
| KR | 20050051865 A | 6/2005 |
| KR | 20050085570 A | 8/2005 |
| KR | 100895173 B1 | 5/2009 |
| RU | 2161869 C1 | 1/2001 |
| RU | 2002123921 A | 2/2004 |
| WO | 0038463 | 6/2000 |
| WO | WO0160106 A1 | 8/2001 |
| WO | 0232160 | 4/2002 |
| WO | WO03073779 | 9/2003 |
| WO | WO2005117321 | 12/2005 |
| WO | WO2006102077 A1 | 9/2006 |
| WO | WO2006110445 A1 | 10/2006 |
| WO | WO2006110456 A1 | 10/2006 |
| WO | WO2007052768 A1 | 5/2007 |
| WO | 2008002823 A1 | 1/2008 |
| WO | 2008157816 A2 | 12/2008 |

OTHER PUBLICATIONS

Written Opinion—PCT/US08/057938, International Search Authority—European Patent Office, Sep. 11, 2008.

Koji Ishibashi et al: "Low Complexity Bit-Interleaved Coded DAPSK with Cyclic Delay Diversity" IEEE International Symposium on Personal, Indoor and Mobile Radio Communications, Sep. 1, 2007, pp. 1-5, XP031168300.

Roland Bless et al: "A quality-of-service signaling architecture for seamless handover support in next generation, IP-based mobile networks" Wireless Personal Communications, vol. 43, No. 3, Jun. 13, 2007, pp. 817-835, XP019557969.

European Telecommunications Standards Institute (ETSI),"Universal Mobile Telecommunications System (UMTS); Radio Resource Control (RRC); Protocol specification (3GPP TS 25.331 version 7.4.0 Release 7); ETSI TS 125 331" ETSI Standards, vol. 3-R2, No. V7.4.0, Mar. 1, 2007, XP014037920.

Maeda S., "4-5. Multichannel Broadcast Service for Cellular Phones: MediaFLO," Journal of the Institute of Image Information and Television Engineers, Japan, May 1, 2006, vol. 60, No. 5, pp. 725-727.

Taiwan Search Report—TW097110302—TIPO—Aug. 13, 2011.

Office Action for Chinese Patent Application No. 200980115981.1 mailed by the SIPO on Dec. 5, 2012.

* cited by examiner

1402

| Content Multiplex Identifier | {RF, LOI} Identifier | Overall number of common multiplexes with current LOI | Total Number of Multiplexes in associated LOI |
|---|---|---|---|
| WID1 | {RF6, LOI4} | 2 | 2 |
|  | {RF1, LOI1} | 1 | 2 |

1404

| Content Multiplex Identifier | {RF, LOI} Identifier | Overall number of common multiplexes with current LOI | Total Number of Multiplexes in associated LOI |
|---|---|---|---|
| LID1 | {RF6, LOI4} | 2 | 2 |

1406

| Content Multiplex Identifier | {RF, LOI} Identifier | Overall number of common multiplexes with current LOI | Total Number of Multiplexes in associated LOI |
|---|---|---|---|
| WID1+LID1 | {RF6, LOI4} | 2 | 2 |

METHODS AND APPARATUS FOR RF HANDOFF IN A MULTI-FREQUENCY NETWORK

CLAIM OF PRIORITY UNDER 35 U.S.C. §119

The present Application for Patent claims priority to Provisional Application No. 60/896,255 entitled "Methods and Apparatus for Providing Handoff in Multiple Frequency Networks" filed Mar. 21, 2007, and to Provisional Application No. 60/945,292, entitled "Methods and Apparatus for Providing Handoff in a Multiple Frequency Network," filed Jun. 20, 2007, both assigned to the assignee hereof and hereby expressly incorporated by reference herein.

CROSS-REFERENCE TO RELATED APPLICATIONS

This application is related to Provisional Application No. 60/910,191, entitled "Methods and Apparatus for Providing Flow Data Acquisition Priority Scheme in a Multiple Frequency Network," filed Apr. 4, 2007, and to Provisional Application No. 60/945,317, entitled "Methods And Apparatus for Providing Flow Data Acquisition Priority Scheme in a Multiple Frequency Network," filed Jun. 20, 2007, both assigned to the assignee hereof and hereby expressly incorporated by reference herein.

BACKGROUND

1. Field

The present application relates generally to the operation of data networks, and more particularly, to methods and apparatus for RF channel selection in a multi-frequency network.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is important for network operators, content retailers, and service providers to have a way to distribute content and/or other network services in a fast and efficient manner and in such a way as to increase bandwidth utilization and power efficiency.

A multi-frequency network (MFN) is a network in which multiple radio frequencies (RFs) (or RF channels) are used to transmit media content. One type of MFN is a horizontal multi-frequency network (HMFN) where a distribution waveform is transmitted over different RF channels in different local areas. The same or different content may be transmitted as part of distribution waveforms carried over different RF channels in such local areas. Another type of MFN is a vertical multi-frequency network (MFN) in which multiple radio frequency (RF) channels are used in a given local area to transmit independent distribution waveforms with an aim to increase the capacity of the network (in terms of the ability to deliver more content to a device/end user). An MFN deployment may also consist of VMFN in certain areas and HMFN in certain other areas.

In a typical HMFN, a local operations infrastructure (LOI) comprises transmitting sites that operate to transmit a single distribution waveform over an RF channel in a selected geographic area. In a typical VMFN, a local operations infrastructure (LOI) comprises transmitting sites that operate to transmit multiple distribution waveforms over multiple RF channels in a selected geographic area. Each distribution waveform may comprise one or more content flows that can be selected at a receiving device for rendering. Adjacent LOIs may utilize the same or different RF channels.

During operation, a receiving device may perform an RF handoff as a result of data acquisition failures for desired content. For example, acquisition failures can happen due to varying channel conditions as a result of device mobility. Typically, the device may handoff to any available RF channel that carries the desired content. However, if the device randomly hands off to any RF channel that carries the desired content, the LOI associated with the selected RF channel may not carry other content that is in common with the current LOI. Also, the LOI associated with the selected RF channel may not carry any additional content that is not available in the current LOI. For example, the LOI associated with the selected RF channel may carry less common content (with the current LOI) than LOIs associated with other available RF channels carrying the desired content. This situation may result in the device not having access to common and additional content after an RF handoff, which will adversely impact the user experience.

Therefore, it is desirable to have a handoff mechanism that operates to allow a device to perform a handoff in a multi-frequency network in a fast and efficient manner and to maximize common and additional content for an enhanced user experience.

SUMMARY

In one or more aspects, a handoff system, comprising methods and apparatus, is provided that operates to provide for handoff in a multi-frequency network. For example, when a handoff event is detected, the handoff system determines a new RF channel to which a device may tune to receive desired content. The handoff system operates to consider a plurality of factors, including but not limited to, signal strength, content availability, and other factors to determine the new RF channel. After the switch to the new RF channel, the device can receive the desired content and has the ability to switch to additional content that may be available on other RF channels in the associated LOI in a fast and efficient manner.

In an aspect, a method is provided for RF channel handoff in a multi-frequency network. The method comprises generating seamless handoff tables and partially seamless handoff tables for multiplexes carried in a current LOI, wherein the seamless and partially seamless handoff tables comprise neighboring RF channels carrying one or more of the multiplexes in the current LOI, detecting a handoff event initiated by acquisition failures on a current RF, selecting a selected RF channel from the seamless and partially seamless handoff tables, and performing a handoff to the selected RF channel.

In an aspect, an apparatus is provided for RF channel handoff in a multi-frequency network. The apparatus comprises processing logic configured to generate seamless handoff tables and partially seamless handoff tables for multiplexes carried in a current LOI, wherein the seamless and partially seamless handoff tables comprise neighboring RF channels carrying one or more of the multiplexes in the current LOI, and wherein said processing logic is configured further to detect a handoff event initiated by acquisition failures on a current RF and select a selected RF channel from the seamless and partially seamless handoff tables, and channel switch logic configured to perform a handoff to the selected RF channel.

In an aspect, an apparatus is provided for RF channel handoff in a multi-frequency network. The apparatus comprises means for generating seamless handoff tables and partially seamless handoff tables for multiplexes carried in a current LOI, wherein the seamless and partially seamless handoff tables comprise neighboring RF channels carrying one or more of the multiplexes in the current LOI, and means for detecting a handoff event initiated by acquisition failures on a current RF. The apparatus also comprises means for selecting a selected RF channel from the seamless and partially seamless handoff tables, and means for performing a handoff to the selected RF channel.

In an aspect, a computer program product is provided for RF channel handoff in a multi-frequency network. The computer program product comprises a machine-readable medium that comprises a first set of codes for causing a computer to generate seamless handoff tables and partially seamless handoff tables for multiplexes carried in a current LOI, wherein the seamless and partially seamless handoff tables comprise neighboring RF channels carrying one or more of the multiplexes in the current LOI, and a second set of codes for causing the computer to detect a handoff event initiated by acquisition failures on a current RF. The computer program product also comprises a third set of codes for causing the computer to select a selected RF channel from the seamless and partially seamless handoff tables, and a fourth set of codes for causing the computer to perform a handoff to the selected RF channel.

In an aspect, at least one integrated circuit is provided that is configured for RF channel handoff in a multi-frequency network. The at least one integrated circuit comprises a first module configured to generate seamless handoff tables and partially seamless handoff tables for multiplexes carried in a current LOI, wherein the seamless and partially seamless handoff tables comprise neighboring RF channels carrying one or more of the multiplexes in the current LOI, and a second module configured to detect a handoff event initiated by acquisition failures on a current RF. The at least one integrated circuit also comprises a third module configured to select a selected RF channel from the seamless and partially seamless handoff tables, and a fourth module configured to perform a handoff to the selected RF channel.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein:

FIG. 14 shows examples of partially seamless handoff tables for use in aspects of a handoff system.

DESCRIPTION

In one or more aspects, a handoff system is provided that operates at a device to determine an RF channel in a multi-frequency network to which a handoff may be performed so that desired content can be received. In an aspect, the handoff system assembles information related to neighboring RF channels and the content they carry. This information is assembled into seamless and partially seamless handoff tables. A handoff event is initiated when data acquisition fails for desired content. When a handoff event is detected, the handoff system operates to process the generated handoff tables to determine a new RF channel to which the device can switch to receive desired content.

The system is well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

Definitions

The following definitions are used herein to describe aspects of a selection system.

1. Local Area—Refers to a local geographic area such as a building, group of buildings, community, city, county or other local region in which services may be broadcast.
2. Wide Area—Refers to a wide geographic area such as a county, state, multiple states, country, multiple countries or other wide region in which services may be broadcast.
3. Multiplex—Refers to a grouping of content flows.
4. Wide Area Multiplex—Refers to a grouping of content flows that are broadcasted over at least one wide area.
5. Local Area Multiplex—Refers to grouping of content flows that are broadcasted over at least one local area.
6. Wide Area Operations Infrastructure (WOI)—Refers to a grouping of transmitters and associated systems that operate to transmit content flows over a wide area. A WOI maps to the smallest geographical wide area which can carry a wide area multiplex. A wide area multiplex may be broadcasted over one or more WOIs.
7. Local Area Operations Infrastructure (LOI)—Refers to a grouping of transmitters and associated systems that operate to transmit content flows over a local area. A LOI maps to the smallest geographical local area which can carry a local area multiplex. A local area multiplex may be broadcasted over one or more LOIs.
8. RF Channel—Refers to an RF frequency that is used to convey a content distribution waveform over a selected LOI.
9. Content Channel—Refers to selected content flows within a particular distribution waveform. For example, a distribution waveform may comprise multiple content channels and each content channel may comprise one or more content flows.

Acronyms

Figure 1:
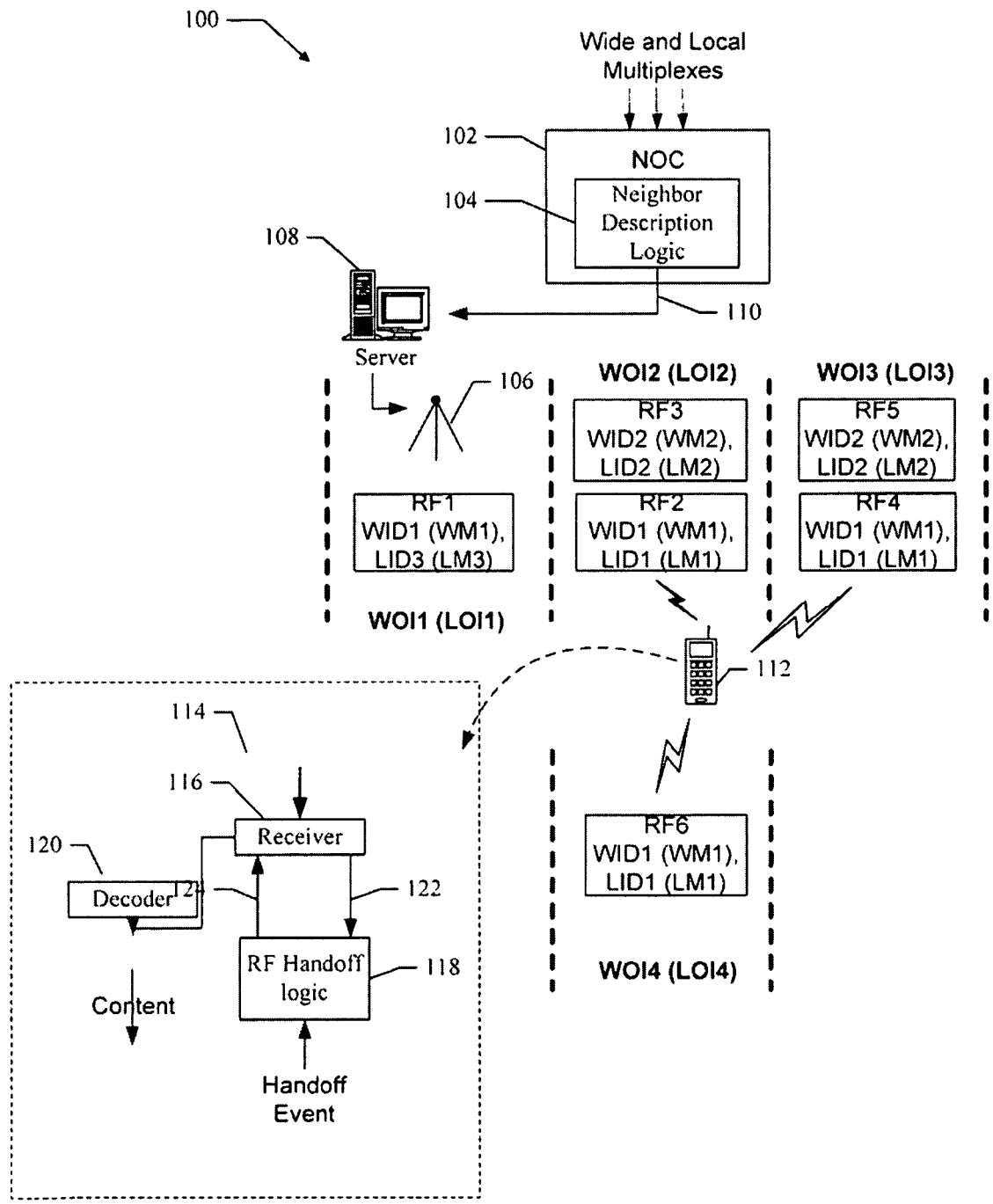
FIG. 1 shows a network that illustrates the operation of aspects of a handoff system for use in a multi-frequency network.

The following acronyms are used herein to describe aspects of a selection system.
LM—Local Area Multiplex
WM—Wide Area Multiplex
NOC—Network Operations Center
WOI—Wide Area Operations Infrastructure
LOI—Local Area Operations Infrastructure
NDM—Neighbor Description Message
WID—Wide Area Descrambling Identifier
LID—Local Area Descrambling Identifier
OIS—Overhead Information Symbols
CC—Control Channel FIG. 1 shows a network 100 that illustrates the operation of aspects of a handoff system to provide RF channel selection in multi-frequency network. For example, the network 100 comprises four WOIs (WOI1, WOI2, WOI3, and WOI4) each comprising one LOI (LOI1, LOI2, LOI3, and LOI4, respectively) of a multi-frequency network. Within each LOI, one or more RF channels are used to transmit content. LOI2 and LOI3 have a vertical MFN with two RF channels in each of these LOs. LOI1 and LOI4 carry only one RF channel. Each RF channel has an associated WID/LID that identifies descrambling sequences that can be used to descramble content transmitted on that RF channel. LOI1, LOI2, LOI3, and LOI4 are neighboring LOIs as shown in the network 100. The LOI1 has LOI2 as its neighbor, the LOI2 has LOI1, LOI3 and LOI4 as its neighbors, the LOI3 has LOI2 as its neighbor and LOI4 has LOI2 as its neighbor.

The network 100 comprises a network operations center (NOC) 102 that operates to receive wide and local content multiplexes for distribution over selected wide and local areas of a multi-frequency network. The NOC 102 also operates to configure the multi-frequency network to distribute that content. To accomplish this, the NOC 102 is aware of the geographic regions of the network that are covered by the LOs, the RF channels used in each region, and any other network information that may be needed to configure the network and distribute the wide and local area content multiplexes. It should be noted that the network 100 may comprise any number of LOs.

In an aspect, the NOC 102 comprises neighbor description logic 104. The neighbor description logic 104 operates to assemble information relating to the list of neighboring LOIs for each LOI and the WID/LID descrambling identifiers that are associated with the RF channels in each LOI. For example, the wide and local area content multiplexes are scrambled with wide area and local area scrambling sequences before transmission over the network 100. In an aspect, the neighbor description logic 104 operates to generate neighbor description messages (NDMs) that are configured to provide a list of neighboring LOIs associated with a particular LOI and WID/LID identifiers that identify descrambling sequences associated with RF channels of the particular LOI and its neighboring LOI. In another aspect, the NDM messages are configured to provide a list of neighboring LOIs and WID/LID identifiers associated with RF channels for any selected group of LOIs. A more detailed description of the NDM messages generated by the neighbor description logic 104 is provided in another section of this document.

The NOC 102 operates to transmit the wide and local area multiplexes and the generated NDMs to the LOIs in the network 100. It should be noted that although only four LOIs are shown, the NOC 102 may transmit the multiplexes and associated NDMs to any number of LOI.

In an aspect, the LOI1, LOI2, LOI3, and LOI4 comprise one or more transmitter sites. For example, the LOI1 comprises transmitter site 106. Each transmitter site operates to transmit a distribution waveform on a selected RF channel over its respective LOI. It should be noted that each transmitter site comprises one or more servers as illustrated at 108.

In an aspect, the NOC 102 operates to transmit the content multiplexes and the NDMs to the transmitter sites using any suitable transport mechanism. For example, the content multiplexes and the NDMs are transmitted to servers associated with each transmitter site, as illustrated at 110. In an aspect, the NOC 102 transmits the content multiplexes and the NDM messages to the transmitter sites using an MPEG-2 transport mechanism. In this configuration, the multiplexes and NDM messages are assigned MPEG-2 transport identifiers so that servers at each transmitter site can detect and receive selected content multiplexes and an NDM message which are directed to them, respectively.

The servers at the transmitter sites use the transport identifiers to determine which multiplexes and NDM message are intended for them to distribute over their respective LOI. The servers then operate to pack their respective multiplexes and the NDM message into transmission frames for transmission over selected RF channels. The servers utilize any suitable physical layer process to pack the multiplexes and the NDM message into the transmission frames for transmission. By using the transport identifiers to determine the multiplexes and the NDM message intended for transmission over their respective LOs, the servers at the transmitter sites need not decode any of the multiplexes or NDM messages. The servers simply detect the appropriate transport identifiers and then pack the identified multiplexes and the NDM message into the transmission frames according to the physical layer process.

The transmission frames comprise content flows associated with the wide and local area multiplexes and the NDM message generated by the neighbor description logic 104. In an aspect, the transmission frames comprise wide and local data partitions that are used to convey the wide and local area content flows, respectively. In addition, the wide and local partitions comprise wide and local control channels. In an aspect, the local control channel is used to distribute the NDM message generated by the neighbor description logic 104 to the devices in each LOI.

In an aspect, the transmitter sites transmit transmission frames over their respective LOIs using the designated RF channels. By using multiple RF channels in LOIs for transmitting transmission frames, the network 100 is able to transmit more content flows over such LOIs. It should be noted that the transmitter sites within a LOI may be co-located or separated by any desired distance. It should also be noted that the NDMs distributed over each LOI may be different because each LOI may have a different set of neighbor LOIs and each neighbor LOI may be associated with different RF channels and associated descrambling sequences with which to descramble the transmitted content.

Within each LOI, descrambling sequence identifiers are associated with each RF channel. The descrambling sequence identifiers comprise wide area descrambling sequence identifiers (WID) and local area descrambling sequence identifiers (LID). The descrambling sequence identifiers identify descrambling sequences that can be used to descramble content received in a particular LOI on a particular RF channel. The descrambling sequence identifiers also identify content multiplexes carried on a particular RF channel. For example, in LOI2 there are two RF channels (i.e., RF2, RF3) and each RF channel is associated with descrambling sequence identifiers that identify descrambling sequences that can be used to descramble associated wide area and local area content multiplexes. For example, RF2 is associated with WID1 and LID1 and carries wide multiplex WM1 and local multiplex LM1; and RF3 is associated with WID2 and LID2 and carries wide multiplex WM2 and local multiplex LM2. WID1, LID1, WID2 and LID2 identify multiplexes WM1, LM1, WM2 and LM2 respectively.

A device 112 operating in the L0I2 is tuned to receive wide area content on channel RF2 that can be descrambled with a descrambling sequence identified by WID1. Details of the device 112 are shown at 114. The device 112 comprises a receiver 116 that operates to tune to a selected RF channel to receive transmission frames. For example, the receiver 116 is tuned to RF2 in LOI2 to receive transmission frames. The transmission frames that are received comprise a local control channel that conveys neighbor description information in one or more NDMs. For example, the NDMs are generated by the neighbor description logic 104 and distributed to the LOIs shown in FIG. 1. In an aspect, an NDM comprises the list of neighboring LOIs for a device's current LOI (i.e. LOI2 for device 112) and WID/LID descrambling identifiers that identify descrambling sequences that are associated with RF channels in the current LOI (i.e., LOI2) and its neighboring LOIs (i.e., LOI1, LOI3 and LOI4).

The receiver 116 passes the neighbor description information received in an NDM (or the NDM itself) to RF handoff logic 118, as illustrated at 122. The receiver 116 also descrambles the received content using the correct WID/LID identifiers associated with RF2 in LOI2 and passes the descrambled content to a decoder 120 that operates to render the content for the device user.

The RF handoff logic 118 operates to receive the NDM at 122. The NDM specifies a list of neighboring LOIs for a given LOI and WID/LID identifiers for RF channels in the given LOI and its neighboring LOs. From this information, the RF handoff logic 118 operates to generate seamless handoff tables and partially seamless handoff tables for content multiplexes carried in device's current LOI. The seamless and partially seamless handoff tables for a given content multiplex carried in the current LOI provide a list of neighboring RFs which can be switched to acquire the given content multiplex. The seamless and partially seamless handoff tables are computed separately for wide and local content multiplexes. For example, a neighboring RF channel has an entry in the wide seamless handoff table associated with a given wide content multiplex carried in the current LOI if that neighboring RF channel carries the given wide content multiplex and if the LOI associated with the neighboring RF channel carries the same set or a superset of wide content multiplexes as the device's current LOI. A neighboring RF channel has an entry in the wide partially seamless handoff table associated with a given wide content multiplex carried in the current LOI if that neighboring RF channel carries the given wide content multiplex and if the LOI associated with the neighboring RF channel does not carry the same set or a superset of wide content multiplexes as the device's current LOI.

In an aspect, an RF handoff may be desired due to one or more handoff events. A handoff event causes the handoff logic 118 to determine a new RF channel and to send a request 124 to the receiver 116 to tune to the new RF channel. The handoff events are events that cause the device 112 to switch from one RF channel to another RF channel to receive a desired content flow. In an aspect, a handoff event can be triggered by or be performed as a result of content acquisition failures associated with desired content (e.g. failures due to varying channel conditions because of device mobility).

In an aspect, content acquisition failures associated with device mobility occur when the device 112 moves from a region covered by LOI2 to a region covered by one or more neighboring LOIs. For example, the device receiver 116 is tuned to receive a desired content flow on a particular RF channel in LOI2. The RF handoff logic 118 operates to determine an RF channel in a neighboring LOI that the receiver 116 can tune to in order to continue to receive the desired content flow when a content acquisition failure is detected as the device 112 moves outside the coverage area of LOI2.

To determine a new RF channel carrying the desired content flow, the RF handoff logic 118 operates to perform one or more of the following functions in aspects of the handoff system.

1. Determine (from received neighbor description information) a list of available RF channels in neighboring LOIs that carry the desired content flow so that a smooth transition can be performed from the content acquisition perspective.
2. Monitor signal strength of neighboring RF channels.
3. Generate seamless and partially seamless handoff tables for desired content. These tables comprise entries based on the list of available RF channels and the content available in LOIs associated with these RF channels.
4. Rank the RF channels within the seamless and partially seamless tables.
5. Select a selected RF channel from the seamless handoff table based on rank, wherein the selected RF channel meets RF selection criteria.
6. Select the selected RF channel from the partially seamless handoff table based on rank wherein the selected RF channel meets RF selection criteria, if selection from the seamless handoff table fails.

Once the RF channel is determined, the RF handoff logic 118 outputs an RF channel switch message 124 to the receiver 116 to implement the RF handoff. The RF channel switch message contains the correct WID/LID identifiers for the selected RF channel so that the desired content flow can be descrambled by the receiver 116. The receiver 116 performs an RF channel switch to the selected RF channel and descrambles content using the WID/LID received in the channel switch message.

Therefore, in various aspects, the handoff system operates to determine which of the available RF channels in a multi-frequency network is to be selected for handoff so that the reception of desired content can continue after content acquisition failures are detected for the desired content. The handoff system determines the selected RF channel based on seamless and partially seamless handoff tables that are used to rank the available RF channels. Thus, the handoff system operates to select an available RF channel with the highest ranking which meets RF selection criteria. The RF selection criteria ensure that the selected RF channel has a large enough received signal strength indicator (RSSI) value and also meets RF handoff criteria. Details of RF handoff criteria are provided in other sections of this document.

Figure 2:
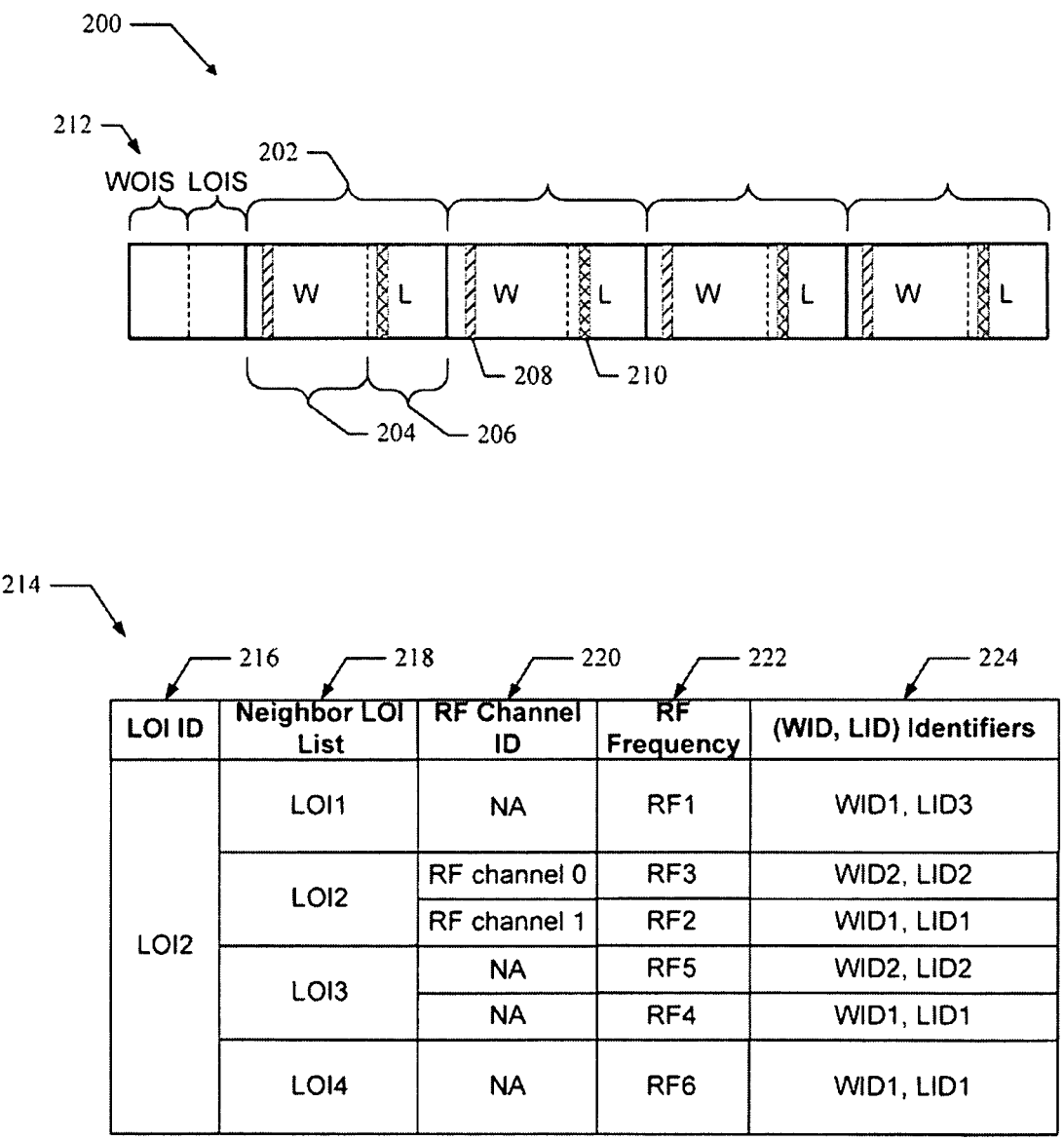
FIG. 2 shows a transmission frame and neighbor description information for use in aspects of a handoff system.

FIG. 2 shows a diagram of a transmission frame 200 for use in aspects of a handoff system. For example, the transmission frame 200 may be packed with wide and local content multiplexes and transmitted over the RF channels in the LOIs shown in FIG. 1.

The transmission frame 200 comprises four sub-frames, shown generally at 202, that are used to convey wide and local content. For example, each sub-frame 202 comprises a wide area partition 204 that is packed with wide area content, and a local area partition 206 that is packed with local area content.

Included in the wide area partition 204 is a wide area control channel 208. The wide area control channel 208 operates to convey messages pertaining to wide area content multiplexes. Included in the local area partition 206 is a local area control channel 210. The local area control channel 210 operates to convey messages pertaining to local area content multiplexes. In an aspect, the local area control channel is used to convey neighbor description information as part of the NDM message for use in aspects of a handoff system.

At the start of the transmission frame 200 are overhead information symbols (OIS) 212 that provide overhead information that is used to locate the wide area control channel, the local area control channel, and the wide and local content that is packed into the sub-frames 202. The OIS 212 comprises wide overhead information symbols (WOIS) and local overhead information symbols (LOIS).

In an aspect, content flows are transmitted using Media Logical Channels (MLCs) inside the sub-frames 202. A single MLC may be used to carry one or more content flows. Content flow data can be successfully acquired even if all packets in an MLC are not received correctly because of redundancy added in the data transmitted as part of the MLC. Data acquisition fails for a content flow if MLC packet erasures exceed the allowed error threshold based on added redundancy in the data transmitted as part of the MLC.

In an aspect, neighbor description information contained in the NDM message is generated separately for each LOI and is configured to provide a list of RF channels associated with a selected LOI and its neighboring LOIs. In another aspect, a NDM message is generated for a selected group of LOIs (which may or may not be neighbors), and includes all neighboring LOIs for each of the LOI within the selected group of LOIs. Each of the RF channels described in the neighbor description information is associated with WID/LID descrambling identifiers.

In an aspect, the NDM message is distributed over a LOI using a local control channel that is part of the transmission frames transmitted by the RF channels in that LOI. It should be noted that the neighbor description information carried in the NDM may be formatted in any suitable format, encoded or encrypted, and/or reorganized or divided into two or more message components.

A table 214 illustrates how parameters provided in the NDM message may be organized and stored at a device. The table 214 comprises a LOI identifier 216 that identifies the device's current LOI (i.e., LOI2). The table 214 also includes a Neighbor LOI List 218 that identifies neighboring LOIs of the device's current LOI plus the current LOI itself. The table 214 also includes RF channel identifiers 220, which indicate identifiers that may be used to reference to particular RF channels of the current LOI in other control channel messages. Note that the RF channel identifiers 220 are only provided for the current LOI (i.e., LOI2).

The table 214 also comprises RF Frequency identifiers 222 that identify RF frequencies associated with each LOI identified in the Neighbor LOI List 218. The table 214 also comprises WID/LID Identifiers 224 that identify WID/LID descrambling sequence identifiers associated with each RF Frequency 222. Thus, the table 214 may be created and stored at a receiving device and used during operation of the handoff system.

Figure 3:
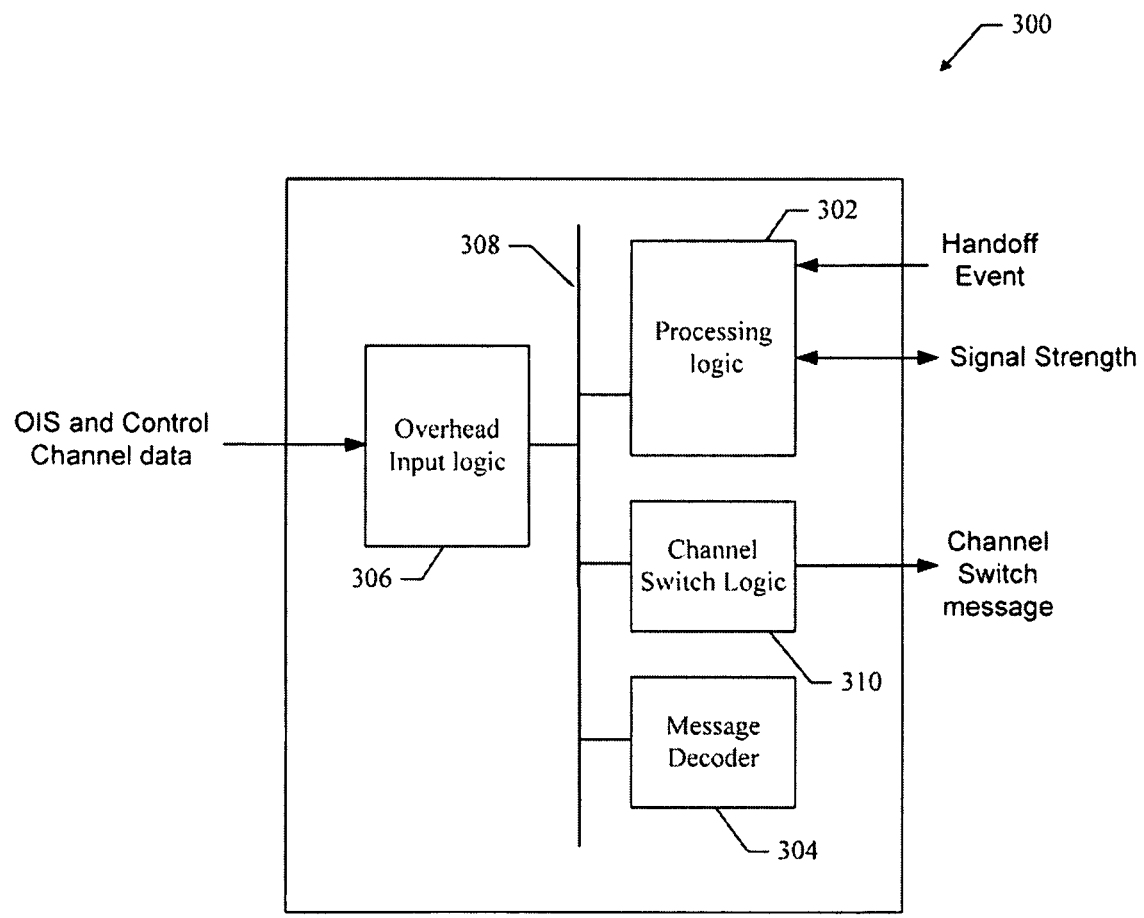
FIG. 3 shows RF channel selection logic for use in aspects of a selection system.

FIG. 3 shows RF handoff logic 300 for use in aspects of a handoff system. For example, the RF handoff logic 300 is suitable for use as the RF handoff logic 118 shown in FIG. 1. The RF handoff logic 300 comprises processing logic 302, message decoder 304, channel switch logic 310, and overhead input logic 306 all coupled to a data bus 308.

The overhead input logic 306 comprises at least one of a CPU, processor, gate array, hardware logic, memory elements, and/or hardware executing software. The overhead input logic 306 operates to receive OIS and control channel data over an RF channel to which a device is currently tuned. The overhead input logic 306 passes the received CC data to the message decoder 304. For example, the overhead input logic 306 operates to receive an NDM message that is transmitted over a local control channel as illustrated in FIG. 2.

The message decoder 304 comprises at least one of a CPU, processor, gate array, hardware logic, memory elements, and/or hardware executing software. In an aspect, the message decoder 304 operates to decode an NDM message received by the control channel input logic 306. For example, the message decoder 304 operates to decode the received NDM message to determine available RF channels associated with the current LOI and its neighboring LOIs. The message decoder 304 decodes the received NDM message to determine WID/LID descrambling sequence identifiers associated with each RF channel in the device's current LOI and its neighboring LOIs. For example, the information received in the NDM message is organized and stored as illustrated in FIG. 2 to provide the WID/LID descrambling identifiers associated with RF channels in the device's current LOI and its neighboring LOIs.

The processing logic 302 comprises at least one of a CPU, processor, gate array, hardware logic, memory elements, and/or hardware executing software. In an aspect, the processing logic 302 operates to receive a handoff event which indicates that an RF handoff is desired because of data acquisition failures associated with desired content due to changing network conditions (e.g. due to device mobility) or other reasons. In such a case, it may be necessary to perform a handoff to switch to an RF channel in a neighboring LOI which carries the desired content to continue to receive the desired content.

The processing logic 302 operates to process information received in the NDM to generate seamless and partially seamless handoff tables for desired content. In an aspect, the processing logic 302 assembles the handoff tables to comprise those RF channels in neighboring LOIs that are associated with the WID/LID of the desired content. In an aspect, neighboring RF channels associated with same WID carry same wide area content and neighboring RF channels associated with same LID carry same local area content. In an aspect, handoff tables comprise wide, local, and wide+local seamless and partially seamless handoff tables.

Once the RF channels in the handoff tables are determined, the processing logic 302 operates to determine signal strength information related to those RF channels. For example, the processing logic 302 operates to perform RF monitoring for neighboring RFs to receive signal strength parameters associated with RF channels identified in the seamless and partially seamless handoff tables. For example, in an aspect, this information is obtained from a device receiver, such as the receiver 116 shown in FIG. 1.

The processing logic 302 also operates to determine information about the content available in the LOIs associated with each RF channel in the handoff tables. For example, the content information comprises the number of available common multiplexes with the current LOI and the total number of available multiplexes in each identified LOI. The processing logic 302 operates to use the content information to rank RF channels in the seamless and partially seamless handoff tables.

The processing logic 302 operates to receive a handoff event. The handoff event indicates that a handoff to another RF channel is needed to continue to acquire the desired content. For example, the handoff event may indicate that a handoff is desired because of content acquisition failures for the desired content e.g. due to changing network conditions.

Once the handoff event is detected for desired content, the processing logic 302 operates to process RF channels in the seamless handoff table associated with the desired content to determine a selected RF channel for handoff. If there are no RF channels in the associated seamless handoff table or if none of the RF channels in the associated seamless handoff table meet RF selection criteria, then the processing logic 302 processes RF channels in the partially seamless handoff table associated with the desired content to determine the selected RF channel for handoff. The processing logic 302 operates to process RF channels in the seamless handoff table and the partially seamless handoff table in their ranking order. Once the selected RF channel is determined, the processing logic 302 passes the identity of this RF channel to the channel switch logic 310. A more detailed description of the operation of the processing logic 302 to select the selected RF channel from the handoff tables and details of RF selection criteria is provided in another section of this document.

The channel switch logic 310 comprises at least one of a CPU, processor, gate array, hardware logic, memory elements, and/or hardware executing software. The channel switch logic 310 operates to generate an RF channel switch message that comprises the identity of the selected RF channel and its WID/LID descrambling sequence identifiers. The RF channel switch message is sent to the device receiver 116. With this information, the receiver 116 can quickly switch to the selected RF channel and use the received WID/LID descrambling sequences to receive the desired content. Thus, during a handoff, an RF channel can be selected that provides the desired content, meets the RF selection criteria, and is ranked highest from the perspective of common content (with current LOI) and additional content carried in the associated LOI for an enhanced user experience.

In an aspect, the handoff system comprises a computer program product having one or more program instructions ("instructions") or sets of "codes" stored or embodied on a machine-readable medium, which when executed by at least one processor, for instance, a processor at the processing logic 302, causes a computer to provide the functions described herein. For example, the sets of codes may be loaded into the RF handoff logic 300 from a machine-readable medium, such as a floppy disk, CDROM, memory card, FLASH memory device, RAM, ROM, or any other type of memory device or machine-readable medium that interfaces to the RF handoff logic 300. In another aspect, the sets of codes may be downloaded into the RF handoff logic 300 from an external device or network resource. The sets of codes, when executed, cause a computer to provide aspects of a handoff system as described herein.

RF Channel Monitoring

In an aspect, the handoff system at the device operates to perform monitoring of RF channels carried in the device's current and neighboring LOIs to maintain information related to signal strength for these RF channels. For example, the processing logic 302 operates to obtain a received signal strength indicator (RSSI) for RF channels in the current LOI and neighboring LOIs. For each available RF channel, the processing logic 302 may also maintain timestamps associated with RSSI measurements. The timestamps associated with RSSI measurements can be used to invalidate old RSSI entries. The processing logic 302 operates to maintain tables of RF channel monitoring information in a local memory. During handoff, the processing logic 302 utilizes information collected during RF channel monitoring to select an RF channel for handoff purposes. For example, signal strength information is used to evaluate RF channels in seamless and partially seamless handoff tables for handoff purposes.

Wide and Local Content Handoff

In an aspect, the handoff system operates to initiate RF handoff based on handoff events. The RF handoff can be initiated for wide content flows and/or local content flows. In an aspect, if a device is attempting to decode only desired wide content flows and content acquisition failures are detected, a wide content RF handoff will be initiated. In an aspect, if device is attempting to decode only desired local content flows and content acquisition failures are detected, a local content RF handoff will be initiated. In another aspect, if device is attempting to decode both desired wide and local flows and content acquisition failures are detected, a wide+local content RF handoff will be initiated. A wide content RF handoff is targeted to handoff to an RF which carries at least the desired wide content. A local content RF handoff is targeted to handoff to an RF which carries at least the desired local content and a wide+local content RF handoff is targeted to handoff to an RF which carries both the desired wide and local content. A specific RF handoff type (wide, local or wide+local) will initiate a handoff to an RF channel in an associated seamless or partially seamless handoff table. For example, a wide content RF handoff will initiate a handoff to an RF channel in the seamless or partially seamless handoff table associated with the desired wide content.

Real Time and Non Real Time Content Handoff

A handoff event can be initiated when a device is attempting to acquire real time content flows and content acquisition failures occur. A handoff event can also be initiated when the device is attempting to acquire non real time content flows and content acquisition failures occur. Real time flows are also referred to as activated flows and non real time flows are also referred to as registered flows. A data acquisition procedure to capture data for these flows can be performed in a variety of ways. For example, one data acquisition procedure to capture data for activated (real time) and registered (non real time) flows is provided in the above referenced application (Provisional Application No. 60/910,191, entitled "methods and Apparatus for Providing Flow Data Acquisition Priority Scheme in a Multiple Frequency Network," filed Apr. 4, 2007, and to Provisional Application No. 60/945,317, entitled "Methods And Apparatus for Providing Flow Data Acquisition Priority Scheme in a Multiple Frequency Network," filed Jun. 20, 2007). The handoff process to execute RF handoff is same for both activated and registered flows, although the handoff process may operate for different timer periods for activated and registered flows. A detailed description of the handoff process for activated and registered flows is captured in other sections of this document.

Handoff Event Trigger Criteria

In an aspect, a handoff event is triggered by certain criteria related to activated and registered flows. Handoff event trigger criteria are evaluated separately for activated and registered flows. If both activated and registered flows are being decoded, then handoff event trigger criteria are evaluated for activated flows only. This is because activated flows (i.e. real time flows) are given higher priority than registered flows (i.e. non real time flows). The failure to acquire an appropriate set of overhead information which includes OIS and control channel (CC) will trigger a handoff event for both activated and registered flows. The overhead information is used to acquire flow data for activated and registered flows.

In various aspects, one or more of the following conditions trigger a handoff event for activated flows.
1. Acquisition of the appropriate OIS and control channel (CC) (if required) fail for desired wide and/or local activated flows. For example if only wide activated flows are being decoded, then WOIS and wide CC fail on the current RF.
2. Data acquisition fails for all activated flows on the current RF.
3. Acquisition of local OIS and local CC (if required) fail if both wide and local activated flows are being decoded on current RF channel.
4. Data acquisition fails for a subset of activated flows on the current RF.

For the acquisition of registered flows, the device determines a selected flow group (FG) and attempts to decode registered flows associated with that selected FG. For example, in an aspect, a flow group comprises a grouping of non real time data flows that are grouped together based on selected criteria, such as priority. An example of various types of flow groups is provided in the above referenced application (Provisional Application No. 60/910,191, entitled "methods and Apparatus for Providing Flow Data Acquisition Priority Scheme in a Multiple Frequency Network," filed Apr. 4, 2007, and to Provisional Application No. 60/945,317, entitled "Methods And Apparatus for Providing Flow Data Acquisition Priority Scheme in a Multiple Frequency Network," filed Jun. 20, 2007). The device also attempts to decode any other registered flows carried by the same RF channel as the selected FG. In various aspects, one or more of the following conditions trigger a handoff event for registered flows:
1. Acquisition of appropriate OIS and CC (if required) fail for wide and/or local registered flows in the selected flow group (FG). For example if selected FG has only wide registered flows, then WOIS and wide CC fail.
2. Data acquisition fails for all registered flows in selected FG.
3. Acquisition of local OIS and local CC (if required) fails if selected FG includes both wide and local registered flows.
4. Data acquisition fails for a subset of registered flows in selected FG.

Seamless Handoff Tables

In an aspect, the handoff system operates to generate and maintain seamless handoff tables for wide and local content multiplexes carried on RF channels in the current LOI. In an aspect, a seamless handoff table for a given wide or local content multiplex includes neighboring RF channels that carry the same given wide or local content multiplex, respectively, and the LOI associated with the neighboring RF channel carries the same set or a superset of wide or local content multiplexes, respectively, as carried in the current LOI. In an aspect, a seamless handoff table for a given combination of wide+local multiplexes includes neighboring RF channels that carry the same combination of wide+local content multiplexes and the LOI associated with the neighboring RF carries the same set or a superset of wide and local content multiplexes as carried in the current LOI. The neighboring RFs included in a given seamless handoff table are referred to as seamless RFs for the associated content multiplex(es).

The following types of seamless handoff tables are maintained:
a. Wide seamless handoff table: A separate wide seamless handoff table is generated and maintained for each wide content multiplex carried in the current LOI. This table identifies neighboring RF channels that carry the same wide content multiplex and their associated LOI carries same set or a superset of wide content multiplexes as the current LOI.
b. Local seamless handoff table: A separate local seamless handoff table is generated and maintained for each local content multiplex carried in the current LOI. This table identifies neighboring RF channels that carry the same local content multiplex and their associated LOI carry same set or a superset of local content multiplexes as the current LOI.
c. Wide+Local seamless handoff table: A separate wide+local seamless handoff table is generated and maintained for each combination of wide+local content multiplexes carried on a single RF in the current LOI. This table identifies neighboring RF channels that carry the same combination of wide+local content multiplexes and their associated LOI carries same set or a superset of wide+local content multiplexes as the current LOI.

Depending on the content carried by neighboring RFs, seamless handoff tables may be empty for one or more of the content multiplexes (wide, local or wide+local) carried in current LOI. In an aspect, the seamless handoff table maintains information for each seamless RF channel related to: i) total number of wide and local content multiplexes that are common between the LOI associated with that seamless RF channel and the device's current LOI; and ii) overall total number of content multiplexes carried in the LOI associated with that seamless RF channel. The information (i) and (ii) maintained for seamless RF channels is used to rank these RF channels for the purpose of executing RF handoff.

Figure 4:
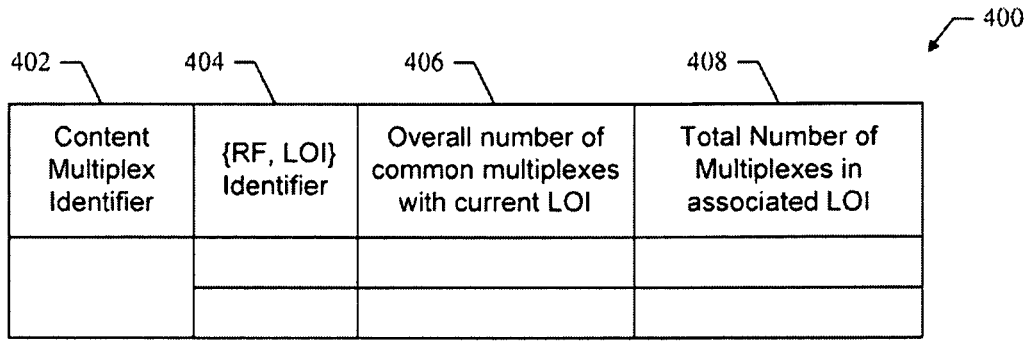
FIG. 4 shows an exemplary seamless handoff table applicable for use as a wide or local seamless handoff table in aspects of a handoff system.

FIG. 4 shows an exemplary seamless handoff table 400 applicable for use as a wide or local seamless handoff table in aspects of a handoff system. In an aspect, the seamless handoff table 400 is generated by the processing logic 302. The seamless handoff table 400 comprises a content multiplex identifier 402 which identifies the wide or local content multiplex for which this seamless handoff table is generated. The seamless handoff table 400 also comprises a {RF, LOI} Identifier 404 that identifies an RF frequency and associated neighboring LOI that carries the wide or local content multiplex identified by the content multiplex identifier 402. The seamless handoff table 400 also comprises an overall number of common multiplexes indicator 406 that indicates the total number of multiplexes that are common between the LOI associated with the identified seamless RF and the current LOI. The seamless handoff table 400 also comprises a total number of multiplexes indicator 408 that indicates the total number of multiplexes available in the LOI associated with the identified seamless RF.

Figure 5:
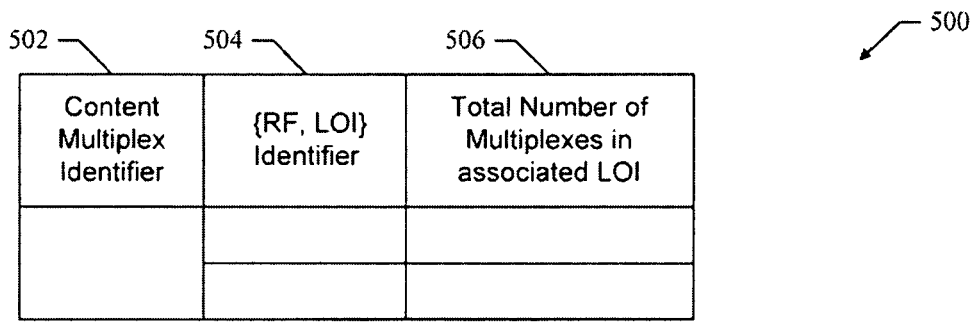
FIG. 5 shows an exemplary seamless handoff table applicable for use as a wide+local seamless handoff in aspects of a handoff system.

FIG. 5 shows an exemplary wide+local seamless handoff table 500 applicable for use in a wide+local seamless handoff in aspects of a handoff system. In an aspect, the wide+local seamless handoff table 500 is generated by the processing logic 302. The wide+local seamless handoff table 500 comprises a content multiplex identifier 502 which identifies the combination of wide+local content multiplexes for which this seamless handoff table is generated. The wide+local seamless handoff table 500 also comprises a {RF, LOI} Identifier 504 that identifies an RF frequency and associated neighboring LOI that carry the wide+local content multiplexes identified by the content multiplex identifier 502. The seamless handoff table 500 also comprises a total number of multiplexes indicator 506 that indicates the total number of multiplexes available in the LOI associated with the identified seamless RF.

Partially Seamless Handoff Tables

In an aspect, the handoff system operates to generate and maintain partially seamless handoff tables for wide and local content multiplexes carried on RF channels in the current LOI. In an aspect, a partially seamless handoff table for a given wide or local content multiplex includes neighboring RF channels that carry the same given wide or local content multiplex respectively, and the LOI associated with the neighboring RF does not carry the same set or a superset of wide or local content multiplexes respectively, as carried in the current LOI. In an aspect, a partially seamless handoff table for a given combination of wide+local multiplexes includes neighboring RF channels that carry the same combination of wide+local content multiplexes and the LOI associated with the neighboring RF does not carry the same set or a superset of wide and local content multiplexes as carried in the current LOI. The neighboring RFs included in a given partially seamless handoff table are referred to as partially seamless RFs for the associated content multiplex(es). As per the definition, the sets of seamless RFs and partially seamless RFs for a given content multiplex are disjoint.

In various aspects, the following types of partially seamless handoff tables are maintained.

a. Wide partially seamless handoff table: A separate wide partially seamless handoff table is generated and maintained for each wide content multiplex carried in the current LOI. This table identifies neighboring RF channels that carry the same wide content multiplex and their associated LOI does not carry same set or a superset of wide content multiplexes as the current LOI.

b. Local partially seamless handoff table: A separate local partially seamless handoff table is generated and maintained for each local content multiplex carried in the current LOI. This table identifies neighboring RF channels that carry the same local content multiplex and their associated LOI does not carry same set or a superset of local content multiplexes as the current LOI.

c. Wide+Local partially seamless handoff tables: A separate wide+local partially seamless handoff table is generated and maintained for each combination of wide+local content multiplexes carried on a single RF in the current LOI. This table identifies neighboring RF channels that carry the same combination of wide+local content multiplexes and their associated LOI does not carry same set or a superset of wide+local content multiplexes as the current LOI.

Depending on the content carried by neighboring RFs, partially seamless handoff tables may be empty for one or more of the content multiplexes (wide, local or wide+local) carried in current LOI. In an aspect, the partially seamless handoff table maintains information for each partially seamless RF channel related to: i) total number of wide and local content multiplexes that are common between the LOI associated with that partially seamless RF channel and the device's current LOI; and ii) overall total number of content multiplexes carried in LOI associated with that partially seamless RF channel. The information (i) and (ii) maintained for partially seamless RF channels is used to rank these RF channels for the purpose of executing RF handoff.

Figure 6:
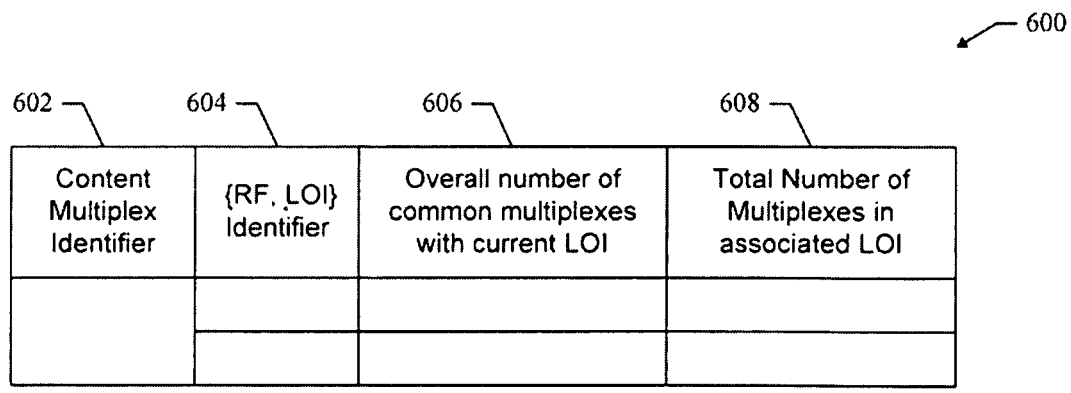
FIG. 6 shows an exemplary partially seamless handoff table applicable for use as a wide, local, or wide+local partially seamless handoff table in aspects of a handoff system.

FIG. 6 shows an exemplary partially seamless handoff table 600 applicable for use as a wide, local, or wide+local partially seamless handoff table for use in aspects of a handoff system. In an aspect, the partially seamless handoff table 600 is generated by the processing logic 302. The partially seamless handoff table 600 comprises a content multiplex identifier 602 which identifies the wide, local or wide+local content multiplexes for which this partially seamless handoff table is generated. The partially seamless handoff table 600 also comprises a {RF, LOI} Identifier 604 that identifies an RF frequency and associated neighboring LOI that carries the wide, local or wide+local content multiplexes identified by the content multiplex identifier 602.

The partially seamless handoff table 600 also comprises an overall number of common multiplexes indicator 606 that indicates the total number of multiplexes that are common between the LOI associated with the identified partially seamless RF and the current LOI. The partially seamless handoff table 600 also comprises a total number of multiplexes indicator 608 that indicates the total number of multiplexes available in the LOI associated with the identified partially seamless RF.

Handoff Table Examples

Figure 13:
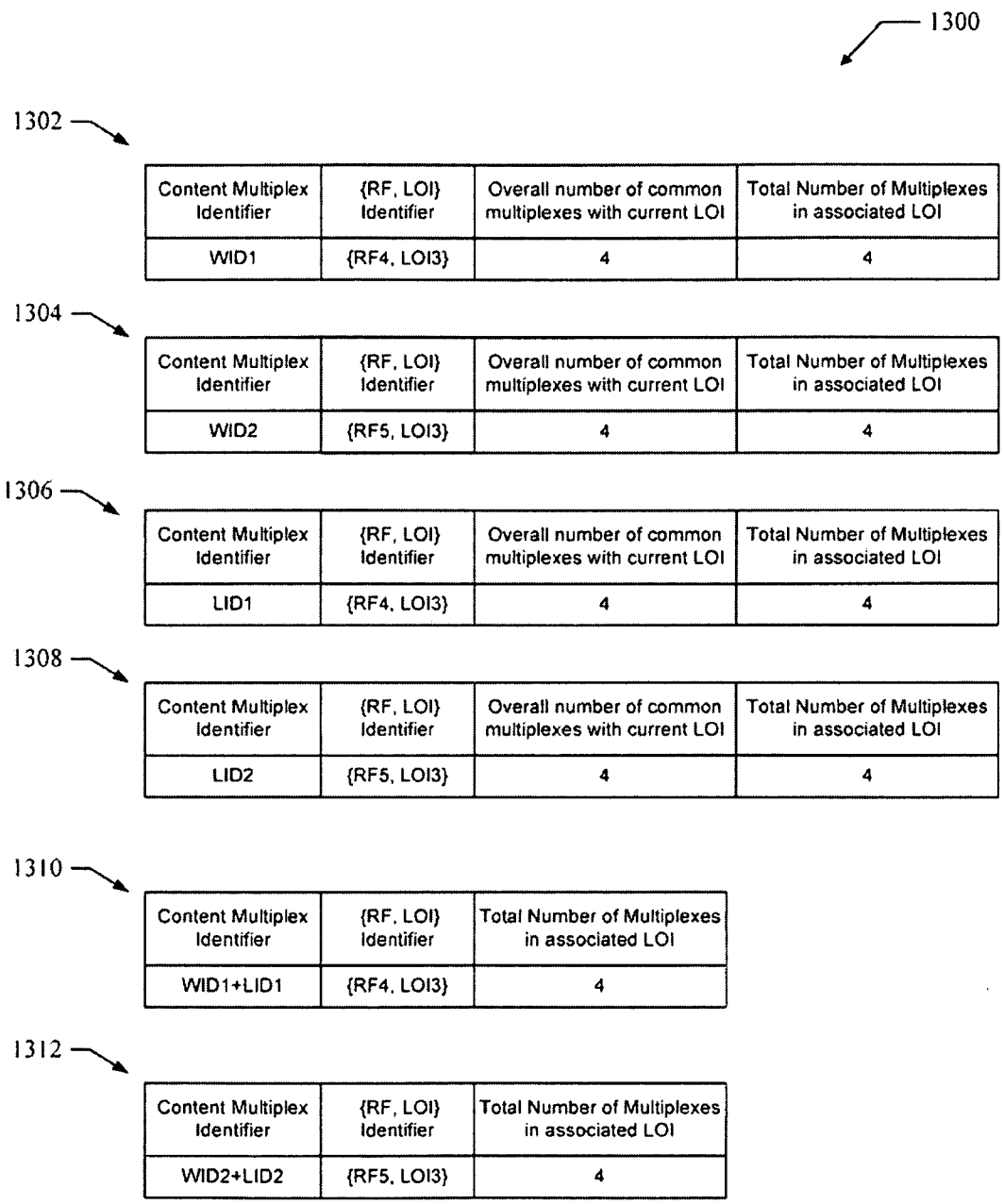
FIG. 13 shows examples of seamless handoff tables for use in aspects of a handoff system.

FIG. 13 shows examples of seamless handoff tables 1300 for use in aspects of a handoff system. For example, it will be assumed that the device 112 is currently located in LOI2 and is operable to receive content multiplexes associated with WID1, WID2, LID1, LID2 that are transmitted on RF2 or RF3 in LOI2. Thus, the seamless handoff tables 1300 reflect the distribution of content in the network configuration illustrated in FIG. 1 as it relates to the device 112 operating in the LOI2.

Wide seamless handoff tables associated with wide content in LOI2 are shown at 1302 and 1304. The wide seamless handoff table 1302 is associated with a wide content multiplex identified by WID1 and includes seamless RF channel RF4 in LOI3, which carries the same wide content multiplex. In addition, the table 1302 shows that LOI3 has four (4) multiplexes in common with LOI2 and that the total number of multiplexes carried in LOI3 is four (4).

The wide seamless handoff table 1304 is associated with a wide content multiplex identified by WID2 and includes seamless RF channel RF5 in LOI3, which carries the same wide content multiplex. In addition, the table 1304 shows that LOI3 has four (4) multiplexes in common with LOI2 and that the total number of multiplexes carried in LOI3 is four (4).

Local seamless handoff tables are shown at 1306 and 1308. The local seamless handoff table 1306 is associated with a local content multiplex identified by LID1 and includes seamless RF channel RF4 in LOI3 which carries the same local content multiplex. In addition, the table 1306 shows that LOI3 has four (4) multiplexes in common with LOI2 and that the total number of multiplexes in LOI3 is four (4).

The local seamless handoff table 1308 is associated with a local content multiplex identified by LID2 and includes seamless RF channel RF5 in LOI3 which carries the same local content multiplex. In addition, the table 1308 shows that LOI3 has four (4) multiplexes in common with LOI2 and that the total number of multiplexes in LOI3 is four (4).

Wide+local seamless handoff tables are shown at 1310 and 1312. The wide+local seamless handoff table 1310 is associated with a combination of wide+local content multiplexes identified by WID1+LID1 and includes seamless RF channel RF4 in LOI3, which carries the same combination of wide+local content multiplexes. In addition, the table 1310 shows that the total number of multiplexes in LOI3 is four (4).

The wide+local seamless handoff table 1312 includes is associated with a combination of wide+local content multiplexes identified by WID2+LID2 and includes seamless RF channel RF5 in LOI3 which, carries the same combination of wide+local content multiplexes. In addition, the table 1308 shows that the total number of multiplexes in LOI3 is four (4).

Thus, the seamless handoff tables 1300 identify wide and/or local content multiplexes in LOI2, seamless RF channels and their associated LOI identifiers for these content multiplexes, and multiplex information for LOIs associated with seamless RFs for use in aspects of a handoff system.

FIG. 14 shows examples of partially seamless handoff tables 1400 for use in aspects of a handoff system. For example, it will be assumed that the device 112 is currently located in LOI2 and is operable to receive content multiplexes associated with WID1, WID2, LID1, LID2 that are transmitted on RF2 or RF3 in LOI2. Thus, the partially seamless handoff tables 1400 reflect the distribution of content in the network configuration illustrated in FIG. 1 as it relates to the device 112 operating in the LOI2.

A wide partially seamless handoff table is shown at 1402. The wide partially seamless handoff table 1402 is associated with a wide content multiplex identified by WID1 and includes partially seamless RF channels RF1 in LOI1, and RF6 in LOI4, which carry the same wide content multiplex. For LOI1, the table 1402 shows that it has one (1) multiplex in common with LOI2 and that the total number of multiplexes in LOI1 is two (2). For LOI4, the table 1402 shows that it has two (2) multiplexes in common with LOI2 and that the total number of multiplexes in LOI4 is two (2).

A local partially seamless handoff table is shown at 1404. The local partially seamless handoff table 1404 is associated with a local content multiplex identified by LID1 and includes partially seamless RF channel RF6 in LOI4, which carries the same local content multiplex. In addition, the table 1404 shows that L014 has two (2) multiplexes in common with L012 and that the total number of multiplexes in LOI4 is two (2).

A wide+local partially seamless handoff table is shown at 1406. The wide+local partially seamless handoff table 1406 is associated with a combination of wide+local content multiplexes identified by WID1+LID1 and includes seamless RF channel RF6 in LOI4, which carries the same combination of wide+local content multiplexes. In addition, the table 1406 shows that LOI4 has two (2) multiplexes in common with LOI2 and that the total number of multiplexes in LOI4 is two (2). It should be noted that partially seamless handoff tables for WID2, LID2 and WID2+LID2 are empty and therefore not shown.

Thus the partially seamless handoff tables 1400 identify wide and/or local content multiplexes in LOI2, partially seamless RF channels and their associated LOI identifiers for these content multiplexes, and multiplex information for LOIs associated with partially seamless RFs for use in aspects of a handoff system.

RF Channel Ranking

In an aspect, RF channels in seamless and partially seamless handoff tables are ranked based on information maintained in these tables. Neighboring RF channels included in seamless and partially seamless handoff tables are ranked to achieve: i) Maximizing number of wide and/or local content multiplexes that are common between LOI associated with neighboring RF channel and device's current LOI; and ii) Maximizing overall total number of content multiplexes in LOI associated with neighboring RF channel. The neighboring seamless and partially seamless RF channels are evaluated in their ranking order for handoff execution to provide enhanced user experience. In various aspects, neighboring RF channels in wide or local seamless handoff table are ranked as follows.

1. The RF channel with more number of common multiplexes (with device's current LOI) in associated LOI is assigned higher rank.
2. Among RF channels with same number of common multiplexes with device's current LOI, RF channel with more number of overall multiplexes in associated LOI is assigned higher rank.
3. Among RF channels with same number of overall multiplexes, RF channels can be assigned ranking in any random order.

In various aspects, neighboring RF channels in wide+local seamless handoff table are ranked as follows.

1. The RF channel with more number of overall multiplexes in associated LOI is assigned higher rank.
2. Among RF channels with same number of overall multiplexes, RF channels can be assigned ranking in any random order.

In various aspects, neighboring RF channels in wide, local and wide+local partially seamless handoff tables are ranked as follows.

1. RF channel with more number of common multiplexes (with current LOI) in associated LOI is assigned higher rank.
2. Among RF channels with same number of common multiplexes in associated LOI, RF channel with more number of overall multiplexes is assigned higher rank.
3. Among RF channels with same number of overall multiplexes in associated LOI, RF channels can be assigned ranking in any random order.

In another aspect, RSSI values (if available) for RF channels carrying common wide and/or local content multiplexes in associated LOIs can also be used to rank seamless and partially seamless RF channels. The seamless and partially seamless RF channels which have higher RSSI values associated with RF channels carrying common wide and/or local content multiplexes in associated LOIs can be assigned higher rank. This will provide better availability of common multiplexes in the new LOI after handoff. The seamless and partially seamless RF channels are evaluated in their ranking order for executing an RF handoff. In an aspect, a seamless or a partially seamless RF channel is considered for a handoff only if it meets a signal strength criteria where RSSI for the RF channel is greater than a defined threshold.

Handoff Overview

An RF handoff to an RF channel in a neighboring LOI is initiated whenever a handoff event (i.e., content acquisition failures) is detected for desired content. The RF channels in seamless and partially seamless handoff tables associated with desired content are considered for performing the handoff. A handoff RF list is generated by combining seamless and partially seamless RF channels associated with desired content. Seamless RF channels are listed higher than partially seamless RF channels in the handoff RF list. Also, individual set of seamless and partially seamless RF channels are listed in their respective rank order in the handoff RF list. The RFs in the handoff RF list are evaluated for handoff in their listed order.

A Handoff_Trigger_RF parameter is maintained which specifies the current RF channel when the handoff event was first initiated. To perform a handoff to a particular neighboring RF, that neighboring RF should meet RF selection criteria. Meeting the RF selection criteria involves meeting a signal strength criterion where the RSSI of the selected RF channel should be greater than a defined threshold and meeting a handoff criterion. The handoff criterion is evaluated with respect to the Handoff_Trigger_RF. In an aspect, a neighboring RF meets the handoff criterion if the following holds true.

$$\text{RSSI of neighboring RF} \geq \text{RSSI of Handoff\_Trigger\_RF} + \text{RSSI\_Hysteresis} \quad (1)$$

The RSSI_Hysteresis is used to minimize ping ponging between the neighboring RF and the Handoff_Trigger_RF. The Handoff_Trigger_RF parameter gets set to the neighboring RF if the WOIS is acquired successfully on that neighboring RF.

The handoff to RFs in the set of neighboring seamless and partially seamless RFs for the desired content is attempted for a finite time period. A handoff timer is maintained to specify the time duration for which handoff should be executed. The handoff timer may be set to different values for activated and registered flows. For example, the handoff timer can be set to a larger value for activated flows as compared to registered flows because of real time nature of activated flows. If desired content can not be acquired after the handoff timer expires, the system gives up attempting to acquire the desire content. The device behavior for activated and registered flows after the handoff timer expires is captured in another section in this document.

Figure 7:
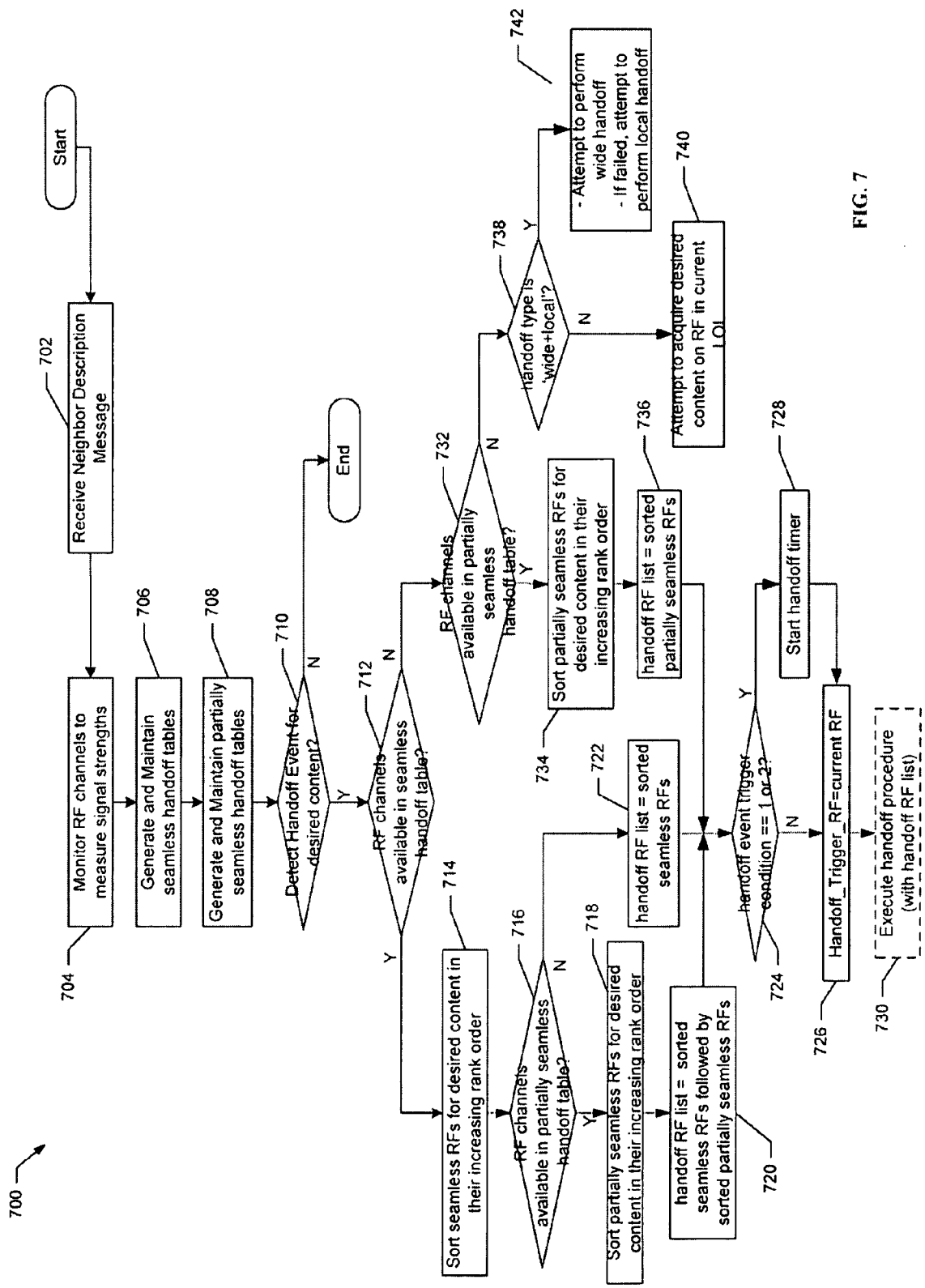
FIG. 7 shows a method for performing a handoff for use in aspects of a handoff system.

FIG. 7 shows a method 700 for performing a handoff for use in aspects of a handoff system. For clarity, the method 700 is described herein with reference to the handoff logic 300 shown in FIG. 3. For example, in an aspect, the processing logic 302 executes one or more sets of codes to control the handoff logic 300 to perform the functions described below.

At block 702, neighbor description information is received as part of the NDM. For example, the neighbor description information identifies neighboring LOIs of the device's current LOI, their associated RF channels, and the multiplexes carried on those RF channels (identified by WID and LID information). In an aspect, the neighbor description information is received over a control channel by the control channel logic 306 and passed to the message decoder 304 where the information is decoded for use by the processing logic 302.

At block 704, the RF channels in the current LOI and its neighboring LOIs are monitored to measure signal strengths (RSSI) for these RF channels. In an aspect, the processing logic 302 operates to request and receive signal strength parameters related to the RFs in the current and neighboring LOIs.

At block 706, seamless handoff tables are generated and maintained. In an aspect, the processing logic 302 operates to generate and maintain seamless handoff tables based on the received neighbor description information. For example, for each multiplex in the current LOI, wide and local seamless handoff tables are formatted as illustrated in FIG. 4, and wide+local seamless handoff tables are formatted as illustrated in FIG. 5.

At block 708, partially seamless handoff tables are generated and maintained. In an aspect, the processing logic 302 operates to generate and maintain partially seamless handoff tables based on the received neighbor description information. For example, for each multiplex in the current LOI, wide, local, and wide+local partially seamless handoff tables are formatted as illustrated in FIG. 6.

At block 710, a determination is made as to whether a handoff event for desired content has been detected. In an aspect, the processing logic 302 operates to detect a handoff event. In an aspect, a handoff event is triggered as the result of acquisition failures associated with desired content. For example acquisition failures may occur due to device mobility. If a handoff event is not detected, the handoff method ends. If a handoff event is detected, the method proceeds to block 712.

At block 712, a determination is made as to whether there are any RF channels in the seamless handoff table associated with the desired content. In an aspect, the processing logic 302 makes this determination based on set of seamless handoff tables maintained. If there are any RF channels in the seamless handoff table associated with the desired content, the method proceeds to block 714. If there are no RF channels in the seamless handoff table associated with the desired content, the method proceeds to block 732.

At block 714, the RF channels in the seamless handoff table associated with the desired content are sorted by increasing rank. In an aspect, the processing logic 302 operates to perform this sorting according to the ranking algorithms described above.

At block 716, a determination is made as to whether there are any RF channels in the partially seamless handoff table associated with the desired content. In an aspect, the processing logic 302 makes this determination based on the set of partially seamless handoff tables maintained. If there are RF channels available in the partially seamless handoff table associated with the desired content, the method proceeds to block 718. If there are no RF channels in the partially seamless handoff table associated with the desired content, the method proceeds to block 722.

At block 718, the RF channels in the partially seamless handoff table associated with the desired content are sorted by increasing rank. In an aspect, the processing logic 302 operates to perform this sorting according to the ranking algorithms described above.

At block 720, a handoff RF list is generated that comprises the sorted seamless RF channels followed by the sorted partially seamless RF channels. In an aspect, the processing logic 302 operates to generate the handoff RF list.

At block 722, a handoff RF list is generated that comprises the sorted seamless RF channels. In an aspect, the processing logic 302 operates to generate the handoff RF list.

At block 724, a determination is made as to whether the detected handoff trigger event is based on one of the first or second handoff trigger conditions out of the four handoff trigger conditions described above. In an aspect, the processing logic 302 makes this determination. If the handoff event is based on the first or second trigger condition, the method proceeds to block 728. If the handoff event is not based on either of the first or second trigger conditions, the method proceeds to block 726.

At block 726, the Handoff_Trigger_RF is assigned to the current RF channel. In an aspect, the processing logic 302 makes this assignment.

At block 728, a handoff timer is started. In an aspect, the handoff timer is maintained by the processing logic 302, which operates to start the timer. In an aspect, the handoff timer parameter may be set to different values for handoffs initiated for activated and registered flows.

At block 730, a handoff procedure is executed based on the current handoff RF list. In an aspect, the handoff procedure is provided by the method 800 shown in FIG. 8.

At block 732, a determination is made as to whether there are any RF channels in the partially seamless handoff table associated with the desired content. In an aspect, the processing logic 302 makes this determination based on set of partially seamless handoff tables maintained. If there are any RF channels in the partially seamless handoff table associated with the desired content, the method proceeds to block 734. If there are no RF channels in the partially seamless handoff table associated with the desired content, the method proceeds to block 738.

At block 734, the RF channels in the partially seamless handoff table associated with the desired content are sorted by increasing rank. In an aspect, the processing logic 302 operates to perform this sorting according to the ranking algorithms described above.

At block 736, a handoff RF list is generated that comprises the sorted partially seamless RF channels. In an aspect, the processing logic 302 operates to generate the handoff RF list.

At block 738, a determination is made as to whether the handoff type is a wide+local handoff. In an aspect, the processing logic 302 makes this determination. If the handoff is a wide+local handoff, the method proceeds to block 742. If the handoff is not a wide+local handoff, the method proceeds to block 740.

At block 740, an attempt is made to acquire the desired content on an RF channel in the current LOI. This is because at this point in the method 700, it has been determined that there are no seamless or partially seamless RF channels available for the desired content.

At block 742, the handoff type is wide+local and no seamless or partially seamless RF channels are available for the desired wide+local content. As a result, an attempt is made to perform a wide handoff for the desired wide content. If the wide handoff fails, an attempt is made to perform a local handoff for the desired local content.

Thus, the method 700 operates to perform a handoff for use in aspects of a handoff system. It should be noted that the method 700 represents just one implementation and that other implementations are possible within the scope of the aspects.

Figure 8:
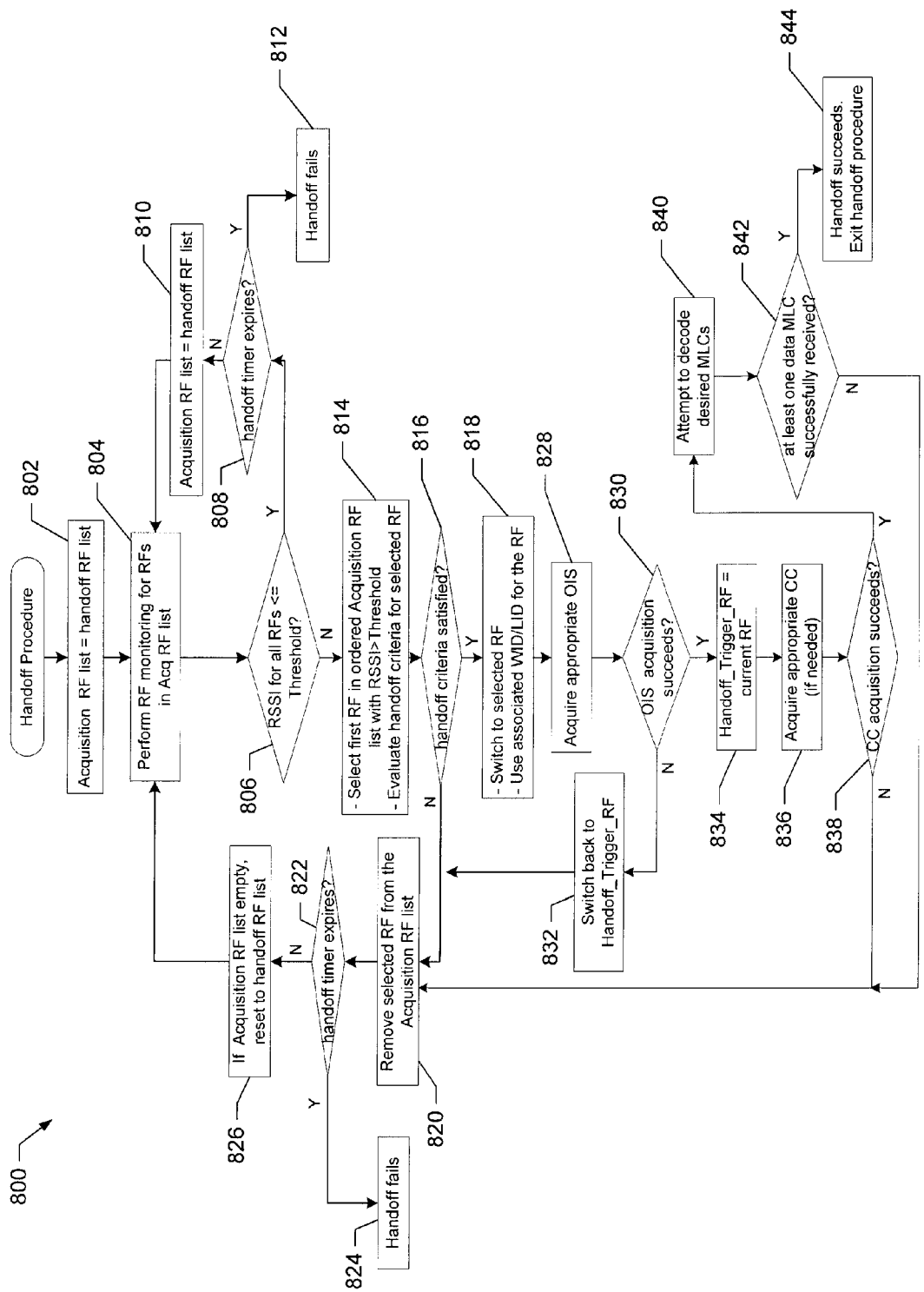
FIG. 8 shows a method for performing a handoff procedure for use in aspects of a handoff system.

FIG. 8 shows a method 800 for performing a handoff procedure for use in aspects of a handoff system. For example, the method 800 is suitable for use at block 730 of the method 700. For clarity, the method 800 is described herein with reference to the handoff logic 300 shown in FIG. 3. For example, in an aspect, the processing logic 302 executes one or more sets of codes to control the handoff logic 300 to perform the functions described below.

At block 802, an Acquisition RF list is set to be equivalent to the current handoff RF list. In an aspect, the handoff RF list is determined by the processing logic 302 as discussed above with reference to the method 700.

At block 804, RF channels in the Acquisition RF list are monitored to measure signal strength (RSSI) for these RF channels. In an aspect, the processing logic 302 operates to communicate with receiving logic at the device to request the RF signal strength characteristic of RFs in the Acquisition RF list.

At block 806, a determination is made as to whether the signal strength of all RFs in the Acquisition RF list is less than a selected signal strength threshold. In an aspect, the processing logic 302 operates to compare the signal strength characteristics of all RFs in the Acquisition RF list to a selected threshold value to make this determination. If the signal strength of all RFs in the Acquisition RF list is less than or equal to the threshold, the method proceeds to block 808. If there are any RFs in the Acquisition RF list that have a signal strength greater than the selected threshold, the method proceeds to block 814.

At block 808, a determination is made as to whether a handoff timer has expired. In an aspect, the processing logic 302 maintains the handoff timer (at block 728) as discussed with reference to the method 700. The processing logic 302 determines if the handoff timer has expired and if so, the method proceeds to block 812. If the handoff timer has not expired, the method proceeds to block 810.

At block 812, a handoff failure is declared. In an aspect, because all RFs in the Acquisition RF list that have a signal strength that is less than or equal to the selected threshold and the handoff timer has expired, the processing logic 302 determines that the attempted handoff has failed.

At block 810, the Acquisition RF list is set to be equivalent to the current handoff RF list. In an aspect, the handoff RF list is determined by the processing logic 302 as discussed above with reference to the method 700.

At block 814, the first RF channel with RSSI>Threshold is selected in the ordered Acquisition RF list. Then an evaluation is performed to evaluate the handoff criterion for the selected RF channel. The handoff criterion is evaluated as described by equation (1) above. In an aspect, the processing logic 302 makes the RF selection and handoff criteria evaluation.

At block 816, a determination is made to determine if the handoff criterion evaluated at block 814 is satisfied for the selected RF channel. In an aspect, the processing logic 302 makes this determination. If the handoff criteria are satisfied for the selected RF channel in the Acquisition RF list, the method proceeds to block 818. If the handoff criterion is not satisfied, the method proceeds to block 820.

At block 820, the selected RF channel is removed from the Acquisition RF list. In an aspect, the processing logic 302 removes the selected RF from the Acquisition RF list because this RF failed to meet the handoff criteria as determined at block 816 or because the OIS could not be successfully acquired on selected RF as determined at block 830 or because acquisition for CC (if required) fails on the selected RF as determined at block 838 or because no MLC could be decoded successfully as determined at block 842.

At block 822, a determination is made as to whether a handoff timer has expired. In an aspect, the processing logic 302 maintains the handoff timer as discussed with reference to the method 700. The processing logic 302 determines if the handoff timer has expired and if so, the method proceeds to block 824. If the handoff timer has not expired, the method proceeds to block 826.

At block 824, a handoff failure is declared. In an aspect, because the handoff timer has expired, the processing logic 302 determines that the attempted handoff has failed.

At block 826, if the Acquisition RF list is empty, the Acquisition RF list is reset to be equivalent to the handoff RF list. In an aspect, the processing logic 302 determines if the Acquisition RF list is empty, and if so, resets it to the handoff RF list.

At block 818, a switch to the selected RF is performed using the WID/LID associated with the RF. In an aspect, the processing logic 302 controls the channel switch logic 310 to switch to the selected RF and use the associated WID/LID to descramble content on that RF.

At block 828, an attempt is made to acquire the OIS on the selected RF channel. In an aspect, the OIS is acquired by the overhead input logic 306.

At block 830, a determination is made as to whether the OIS was acquired successfully on the selected RF. In an aspect, the processing logic 302 makes this determination. If the OIS was not acquired successfully, the method proceeds to block 832. If the OIS was acquired successfully, the method proceeds to block 834.

At block 832, a switch is made to the Handoff_Trigger_RF. In an aspect, the processing logic 302 controls the channel switch logic 310 to switch back to the Handoff_Trigger_RF because the OIS acquisition failed on the selected RF.

At block 834, a Handoff_Trigger_RF is set to the current RF. In an aspect, the processing logic 302 performs this operation.

At block 836, an attempt is made to acquire the appropriate control channel if needed. In an aspect, the overhead input logic 306 performs this operation.

At block 838, a determination is made as to whether the control channel was acquired successfully. In an aspect, the processing logic 302 makes this determination. If the control channel was not acquired successfully, the method proceeds to block 820. If the control channel was acquired successfully, the method proceeds to block 840.

At block 840, an attempt is made to decode media logical channels (MLCs) from the current RF. In an aspect, receiving logic at the device attempts to decode the MLCs and reports the results to the processing logic 302.

At block 842, a determination is made as to whether at least one MLC associated with desired content was decoded successfully. In an aspect, the processing logic 302 makes this determination. If at least one MLC associated with desired content was not decoded successfully, the method proceeds to block 820. If at least one MLC associated with desired content was decoded successfully, the method proceeds to block 844.

At block 844, the handoff is determined to be successful and the handoff procedure ends. In an aspect, the processing logic 302 makes this determination because at least one MLC associated with desired content was successfully decoded.

Thus, the method 800 operates to perform a handoff for use in aspects of a handoff system. It should be noted that the method 800 represents just one implementation and that other implementations are possible within the scope of the aspects.

Figure 9:
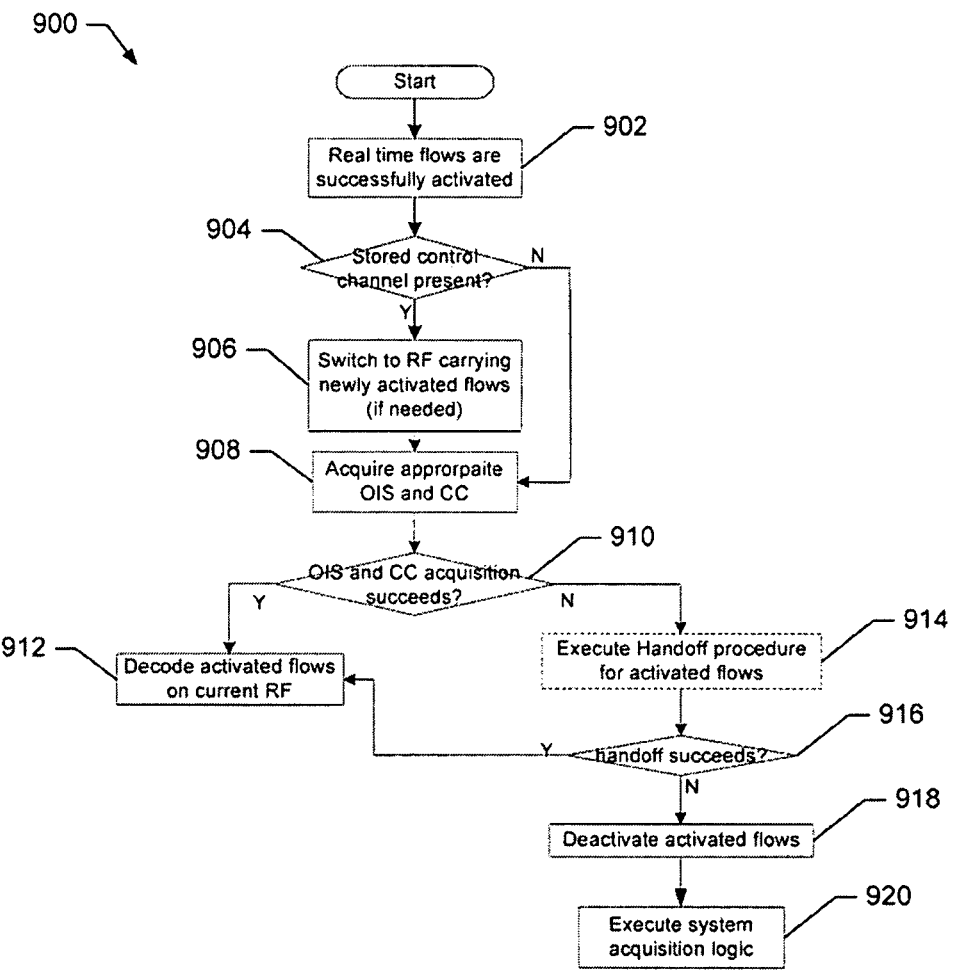
FIG. 9 shows a method for providing a handoff event trigger for activated flows for use in aspects of a handoff system.

FIG. 9 shows a method 900 for providing a handoff event trigger for activated flows for use in aspects of a handoff system. For clarity, the method 900 is described herein with reference to the handoff logic 300 shown in FIG. 3. For example, in an aspect, the processing logic 302 executes one or more sets of codes to control the handoff logic 300 to perform the functions described below.

At block 902, one or more real time flows are successfully activated. In an aspect, applications at the device attempt to acquire one or more real time flows.

At block 904, a determination is made as to whether required control channel information is locally stored. In an aspect, the processing logic 302 operates to determine if the required control channel information is locally stored. If the control channel data is locally stored, the method proceeds to block 906. If the control channel data is not locally stored, the method proceeds to block 908.

At block 906, a switch is performed (if needed) to switch to the RF channel carrying the newly activated flows. In an aspect, the processing logic 302 controls the channel switch logic 310 to switch to the RF channel carrying the newly activated flows. An RF switch will not be required if the device's current RF is the RF carrying newly activated flows.

At block 908, at attempt is made to acquire the appropriate set of OIS and control channel information from the new RF channel. In an aspect, the overhead input logic 306 obtains the OIS and control channel information from the new RF channel.

At block 910, a determination is made as to whether the appropriate set of OIS and control channel information was successfully acquired. In an aspect, the processing logic 302 operates to make this determination. If the OIS and control channel data was not successfully acquired, the method proceeds to block 914. If the OIS and control channel data was successfully acquired, the method proceeds to block 912.

At block 912, the newly activated flows are decoded on the new RF. In an aspect, receiving logic at the device operates to decode the newly activated flows.

At block 914, a handoff procedure is executed in an attempt to acquire the activated flows on a neighboring RF channel. In an aspect, the processing logic 302 operates to execute the handoff procedure because the OIS and CC acquisition fails on the RF channel carrying activated flows in current LOI. In an aspect, the handoff procedure is described above with reference to FIG. 8.

At block 916, a determination is made as to whether the handoff was successful. In an aspect, the processing logic 302 makes this determination. If the handoff was successful, the method proceeds to block 912. If the handoff was not successful, the method proceeds to block 918.

At block 918, the handoff has failed and all activated flows are deactivated. In an aspect, the processing logic 302 operates to deactivate all the activated flows.

At block 920, system acquisition logic is executed. In an aspect, the processing logic 302 operates to initiate system acquisition logic to acquire the system because the handoff failed.

Thus, the method 900 operates to perform providing a handoff event trigger for activated flows for use in aspects of a handoff system. It should be noted that the method 900 represents just one implementation and that other implementations are possible within the scope of the aspects.

Figure 10:
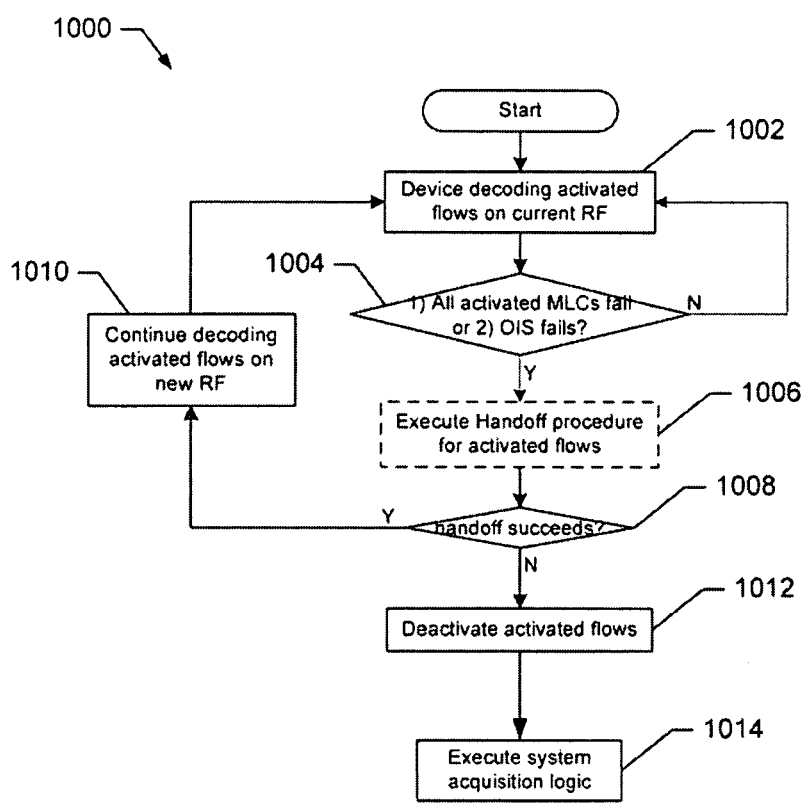
FIG. 10 shows a method for providing a handoff event trigger for activated flows for use in aspects of a handoff system.

FIG. 10 shows a method 1000 for providing a handoff event trigger for activated flows for use in aspects of a handoff system. For clarity, the method 1000 is described herein with reference to the handoff logic 300 shown in FIG. 3. For example, in an aspect, the processing logic 302 executes one or more sets of codes to control the handoff logic 300 to perform the functions described below.

At block 1002, a device is currently decoding activated flows on a current RF channel.

At block 1004, a determination is made to determine whether data acquisition for all MLCs associated with activated flows failed or OIS acquisition failed on the current RF channel. In an aspect, the processing logic 302 makes this determination. If there are no MLCs and OIS failures, the method proceeds to block 1002. If there is either the failure of all MLCs associated with activated flows or the failure of OIS acquisition, then the method proceeds to block 1006.

At block 1006, a handoff procedure for activated flows is executed. For example, the handoff procedure described in FIG. 8 is executed to hand off to a new neighboring RF channel to successfully acquire OIS and activated flows.

At block 1008, a determination is made as to whether the handoff was successful. In an aspect, the processing logic 302 makes this determination. If the handoff was successful, the method proceeds to block 1010. If the handoff was not successful, the method proceeds to block 1012.

At block 1010, the activated flows are decoded from the new RF channel. In an aspect, the device has handed off to a new RF channel and is able to acquire the activated flows from that RF channel.

At block 1012, handoff has failed and all the activated flows are deactivated. In an aspect, the processing logic 302 operates to deactivate the activated flow because the handoff to a different RF channel was unsuccessful.

At block 1014, system acquisition logic is executed. In an aspect, the processing logic 302 operates to initiate system acquisition logic to acquire the system because the handoff failed.

Thus, the method 1000 operates to perform providing a handoff event trigger for activated flows for use in aspects of a handoff system. It should be noted that the method 1000 represents just one implementation and that other implementations are possible within the scope of the aspects.

Figure 11:
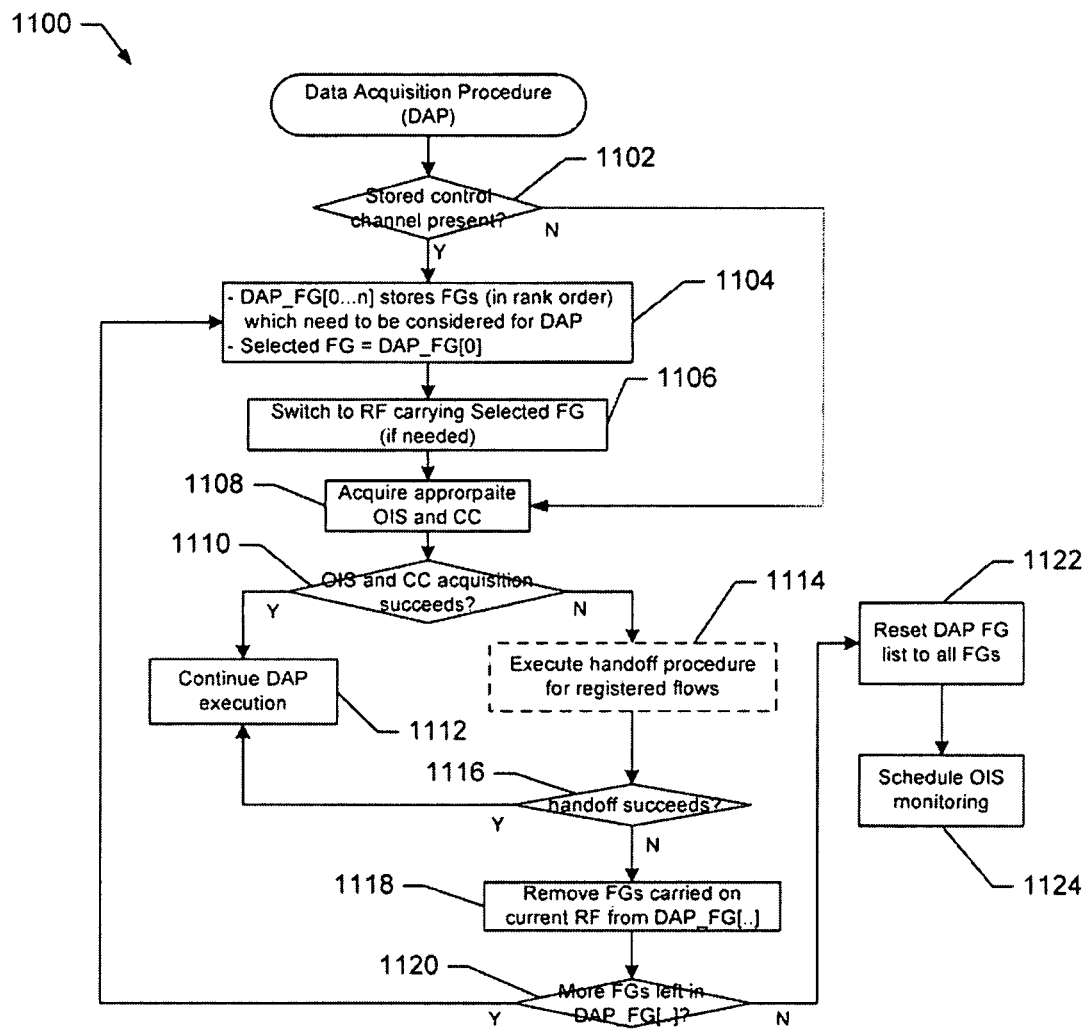
FIG. 11 shows a method for providing a handoff event trigger for registered flows for use in aspects of a handoff system.

FIG. 11 shows a method 1100 for providing a handoff trigger event for registered flows for use in aspects of a handoff system. In an aspect, the method 1100 initiates a handoff in the event of data acquisition failure with respect to registered flows. It should be noted that a detailed description of a data acquisition procedure (DAP) for registered flows is not presented and specific embodiments of such a data acquisition procedure are not essential to the operation of the methods and apparatus of the various embodiments described herein. However, an example of a data acquisition procedure for registered flows can be found in the above referenced application (Provisional Application No. 60/910,191, entitled "methods and Apparatus for Providing Flow Data Acquisition Priority Scheme in a Multiple Frequency Network," filed Apr. 4, 2007, and to Provisional Application No. 60/945,317, entitled "Methods And Apparatus for Providing Flow Data Acquisition Priority Scheme in a Multiple Frequency Network," filed Jun. 20, 2007). In an aspect, the processing logic 302 executes one or more sets of codes to control the handoff logic 300 to perform the functions described below.

At block 1102, a determination is made as to whether required control channel information is locally stored. In an aspect, the processing logic 302 operates to make this determination. If the required control channel information is locally stored, the method proceeds to block 1104. If the control channel information is not locally stored, the method proceeds to block 1108.

At block 1104, flow groups (FGs) comprising registered flows for which data is to be acquired are stored in the DAP_FG[..] list in their rank order. The highest rank FG (DAP_FG[0]) is selected for acquiring registered flow data. In an aspect, the processing logic 302 operates to perform these operations. The processing logic 302 operates to attempt to acquire flow data for registered flows in the selected FG plus other registered flows carried on the same RF channel.

At block 1106, a switch (if required) is performed to the RF carrying the selected flow group. In an aspect, the processing logic 302 controls the channel switch logic 310 to switch to the RF channel carrying the selected FG. An RF switch will not be required if device current RF is the RF carrying the selected FG.

At block 1108, at attempt is made to acquire appropriate set of the OIS and control channel information on the new RF channel. In an aspect, the overhead input logic 306 obtains the OIS and control channel information from the new RF channel.

At block 1110, a determination is made as to whether the acquisition of the OIS and the control channel information succeeded. In an aspect, if the acquisition of the OIS and control channel information was successful, the method proceeds to block 1112. If the acquisition of the OIS and control channel information was not successful, the method proceeds to block 1114.

At block 1112, the execution of the DAP procedure continues to acquire data associated with registered flows. In an aspect, the processing logic 302 operates to continue executing the DAP procedure.

At block 1114, a handoff procedure for registered flows in selected FG is executed. For example, the handoff procedure described in FIG. 8 is executed to hand off to a new neighboring RF channel in an attempt to obtain data for the registered flows in the selected FG.

At block 1116, a determination is made as to whether the handoff was successful. If the handoff was successful, the method proceeds to block 1112. If the handoff was not successful, the method proceeds to block 1118.

At block 1118, all the flow groups carried on the current RF channel are removed from the DAP flow group list. In an aspect, the processing logic 302 operates to remove FGs from the DAP flow group list.

At block 1120, a determination is made as to whether there are any more flow groups left in the DAP flow group list. In an aspect, the processing logic 302 operates to make this determination. In an aspect, if there are more flow groups left in the DAP flow group list, the method proceeds to block 1104. If there are no more flow groups left in the DAP flow group list, the method proceeds to block 1122.

At block 1122, the DAP flow group list is reset to all computed flow groups. In an aspect, the processing logic 302 operates to reset the DAP flow group list.

At block 1124, monitoring of OIS information is scheduled so that acquisition for OIS, CC and flow data for FGs can be attempted again after a selected time interval.

Thus, the method 1100 operates to provide a handoff event trigger for registered flows for use in aspects of a handoff system. It should be noted that the method 1100 represents just one implementation and that other implementations are possible within the scope of the aspects.

Figure 12:
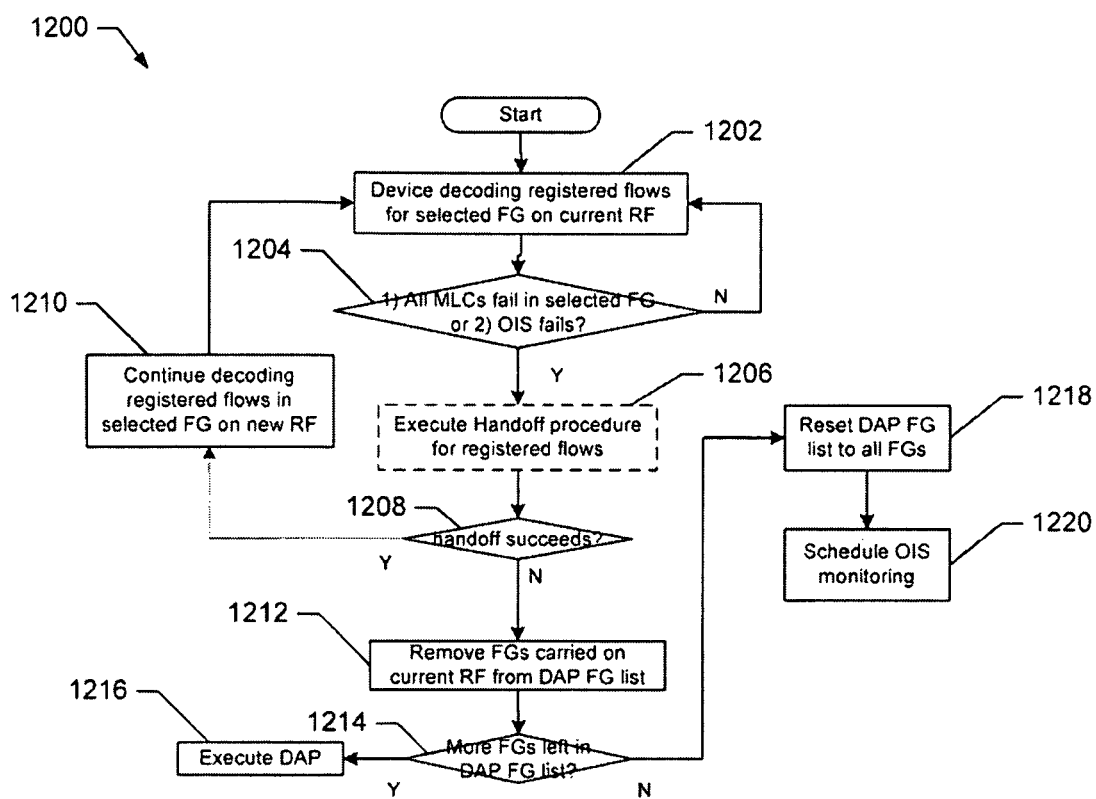
FIG. 12 shows a method for providing a handoff event trigger for registered flows for use in aspects of a handoff system.

FIG. 12 shows a method 1200 for providing a handoff trigger event for registered flows for use in aspects of a handoff system. In an aspect, the method 1200 initiates a handoff in the event of data acquisition failure with respect to registered flows. In an aspect, the processing logic 302 executes one or more sets of codes to control the handoff logic 300 to perform the functions described below.

At block 1202, a device is currently decoding registered flows associated with a selected flow group on a current RF. The device also decodes registered flows associated with other FGs carried on the current RF.

At block 1204, a determination is made to determine whether data acquisition for all MLCs associated with registered flows in the Selected FG failed or OIS acquisition failed on the current RF. In an aspect, the processing logic 302 makes this determination. If there are no MLCs and OIS failures, the method proceeds to block 1202. If there is either failure of all MLCs associated with registered flows in the Selected FG or the failure of OIS acquisition, then the method proceeds to block 1206.

At block 1206, a handoff procedure for the registered flows in the selected FG is executed. For example, the handoff procedure described in FIG. 8 is executed to hand off to a new neighboring RF channel to successfully acquire OIS and registered flows in the selected FG.

At block 1208, a determination is made as to whether the handoff was successful. In an aspect, the processing logic 302 makes this determination. If the handoff was successful, the method proceeds to block 1210. If the handoff was not successful, the method proceeds to block 1212.

At block 1212, all the flow groups carried on the current RF channel are removed from the DAP flow group list. In an aspect, the processing logic 302 operates to remove FGs from the DAP flow group list.

At block 1214, a determination is made as to whether there are more flow groups left in the DAP flow group list. In an aspect, the processing logic 302 operates to make this determination. If there are more flow groups left, the method proceeds to block 1216 to start executing a DAP procedure. If there are no more flow groups left in the DAP flow group list, the method proceeds to block 1218.

At block 1216, a DAP procedure is executed to acquired data for additional flow groups that are left in the DAP flow group list.

At block 1218, the DAP flow group list is reset to list all computed flow groups. In an aspect, the processing logic 302 operates to reset the DAP flow group list.

At block 1220, monitoring of OIS information is scheduled so that acquisition for OIS, CC and flow data for FGs can be attempted again after a selected time interval.

Thus, the method 1200 operates to provide a handoff event trigger for registered flows for use in aspects of a handoff system. It should be noted that the method 1200 represents just one implementation and that other implementations are possible within the scope of the aspects.

Figure 15:
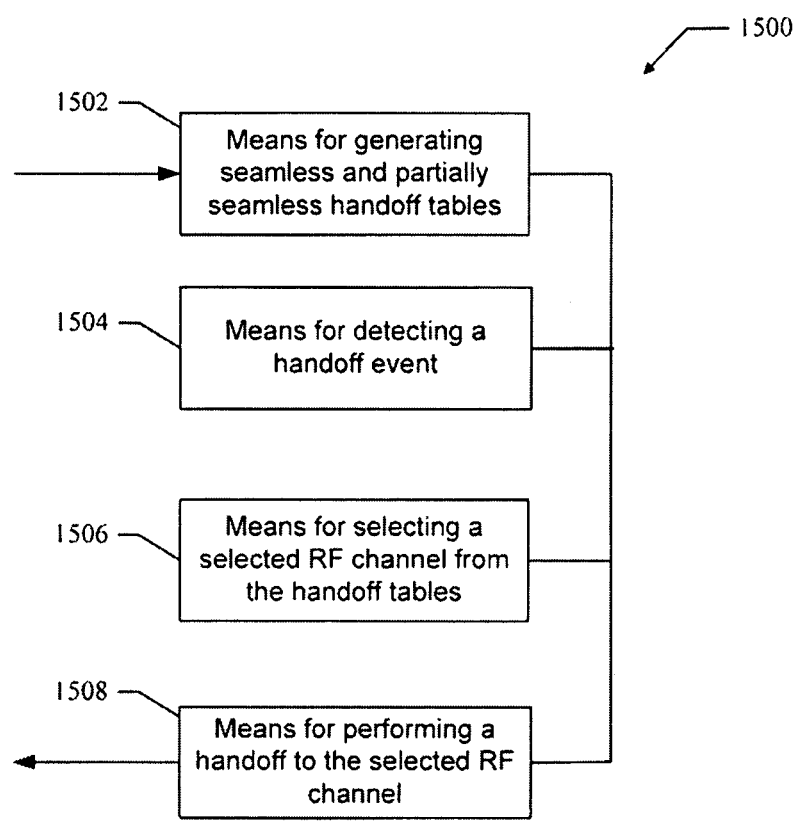
FIG. 15 shows RF handoff logic for use in aspects of a handoff system.

FIG. 15 shows handoff logic 1500 for use in aspects of a handoff system. For example, the handoff logic 1500 is suitable for use as the handoff logic 300 shown in FIG. 3. In an aspect, the handoff logic 300 is implemented by at least one integrated circuit comprising one or more modules configured to provide aspects of a handoff system as described herein. For example, in an aspect, each module comprises hardware and/or hardware executing software.

The handoff logic 1500 comprises a first module comprising means (1502) for generating seamless handoff tables and partially seamless handoff tables for multiplexes carried in a current LOI, wherein the seamless and partially seamless handoff tables comprise neighboring RF channels carrying one or more of the multiplexes in the current LOI, which in an aspect comprises the processing logic 302. The handoff logic 1500 also comprises a second module comprising means (1504) for detecting a handoff event initiated by acquisition failures on a current RF, which in an aspect comprises the processing logic 302. The handoff logic 1500 also comprises a third module comprising means (1506) for selecting a selected RF channel from the seamless and partially seamless handoff tables, which in an aspect comprises the processing logic 302. The handoff logic 1500 also comprises a fourth module comprising means (1508) for performing a handoff to the selected RF channel, which in an aspect comprises the channel switch logic 310.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a handoff system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for radio frequency (RF) channel handoff in a multi-frequency network, the method comprising:
generating seamless handoff tables and partially seamless handoff tables for wide and local content multiplexes carried in a current group of local area transmitters, wherein the seamless and partially seamless handoff tables comprise neighboring RF channels carrying one or more of the wide and local content multiplexes as the current group of local area transmitters;
detecting a handoff event initiated by acquisition failures on a current RF channel;
selecting one of the neighboring RF channels, from the seamless and partially seamless handoff tables, carrying at least the same wide and local content multiplexes as the current group of local area transmitters; and
performing a handoff to the selected RF channel.

2. The method of claim 1, wherein said generating comprises generating a wide seamless handoff table for each wide multiplex in the current group of local area transmitters, wherein the wide seamless handoff table comprises neighboring RF channels that carry the respective wide multiplex and are associated with local operations infrastructures (LOIs) that carry an identical set of wide multiplexes as the current group of local area transmitters.

3. The method of claim 1, wherein said generating comprises generating a local seamless handoff table for each local multiplex in the current group of local area transmitters, wherein the local seamless handoff table comprises neighboring RF channels that carry the respective local multiplex and are associated with local operations infrastructures (LOIs) that carry an identical set of local multiplexes as the current group of local area transmitters.

4. The method of claim 1, wherein said generating comprises generating a wide+local seamless handoff table for each combination of wide+local multiplexes in the current group of local area transmitters, wherein the wide+local seamless handoff table comprises neighboring RF channels that carry the respective combination of wide+local multiplexes and are associated with local operations infrastructures (LOIs) that carry an identical set of wide and local multiplexes as the current group of local area transmitters.

5. The method of claim 1, wherein said generating comprises generating a wide partially seamless handoff table for each wide multiplex in the current group of local area transmitters, wherein the wide partially seamless handoff table comprises neighboring RF channels that carry the respective wide multiplex and are associated with local operations infrastructures (LOIs) that do not carry an identical set of wide multiplexes as the current group of local area transmitters.

6. The method of claim 1, wherein said generating comprises generating a local partially seamless handoff table for each local multiplex in the current group of local area transmitters, wherein the local partially seamless handoff table comprises neighboring RF channels that carry the respective local multiplex and are associated with local operations infrastructures (LOIs) that do not carry an identical set of local multiplexes as the current group of local area transmitters.

7. The method of claim 1, wherein said generating comprises generating a wide+local partially seamless handoff table for each combination of wide+local multiplexes in the current group of local area transmitters, wherein the wide+local partially seamless handoff table comprises neighboring RF channels that carry the respective combination of wide+local multiplexes and are associated with local operations infrastructures (LOIs) that do not carry an identical set of wide and local multiplexes as the current group of local area transmitters.

8. The method of claim 1, further comprising:
determining that two or more neighboring RF channels carry an identical wide multiplex if the two or more neighboring RF channels are associated with an identical wide area descrambling identifier (WID);
determining that two or more neighboring RF channels carry an identical local multiplex if the two or more neighboring RF channels are associated with an identical local area descrambling identifier (LID); and
determining that two or more neighboring RF channels carry an identical combination of wide+local multiplexes if the two or more neighboring RF channels are associated with an identical combination of a wide area descrambling identifier (WID) and a local area descrambling identifier (LID).

9. The method of claim 1, wherein said detecting comprises detecting the handoff event based on at least one of an acquisition failure for data associated with one or more activated flows, an acquisition failure for data associated with one or more registered flows, an acquisition failure for overhead information symbols (OIS) and an acquisition failure for a control channel (CC).

10. The method of claim 1, wherein said detecting comprises detecting the handoff event to comprise one of a wide handoff type if only wide flows are associated with acquisition failures, a local handoff type if only local flows are associated with acquisition failures, and a wide+local handoff type if both wide and local flows are associated with acquisition failures.

11. The method of claim 10, wherein said selecting comprises selecting the selected RF from one of a wide seamless handoff table and a wide partially seamless handoff table associated with a wide multiplex on the current RF channel, if the handoff event comprises the wide handoff type.

12. The method of claim 10, wherein said selecting comprises selecting the selected RF from one of a local seamless handoff table and a local partially seamless handoff table associated a local multiplex on the current RF channel, if the handoff event comprises the local handoff type.

13. The method of claim 10, wherein said selecting comprises selecting the selected RF from one of a wide+local seamless handoff table and a wide+local partially seamless handoff table associated with a combination of wide+local multiplexes on the current RF channel, if the handoff event comprises the wide+local handoff type.

14. The method of claim 13, further comprising:
detecting the handoff event to comprise the wide+local handoff type;
determining that the wide+local seamless handoff table and the wide+local partially seamless handoff table associated with the wide+local multiplexes on the current RF are empty;
selecting the selected RF from one of a wide seamless handoff table and a wide partially seamless handoff table associated with the wide multiplex on the current RF;
attempting a handoff to the selected RF; and
selecting the selected RF from one of a local seamless handoff table and a local partially seamless handoff table associated with the local multiplex on the current RF if the attempted handoff fails.

15. The method of claim 10, further comprising:
generating a handoff RF list by combining RF channels from selected seamless and partially seamless handoff tables associated with at least one selected multiplex on the current RF based on the handoff type; and
repeating the following operations until a successful handoff occurs:
selecting the selected RF channel from the handoff RF list;
performing a handoff to the selected RF channel;
determining that the handoff to the selected RF failed; and
removing the selected RF from the handoff RF list.

16. The method of claim 15, wherein said repeating comprises repeating the operations of selecting, determining, and removing for a selected handoff time duration.

17. The method of claim 15, wherein said selecting comprises selecting the selected RF channel from the selected seamless handoff table before the selected partially seamless handoff table.

18. The method of claim 15, wherein said selecting comprises:
ranking the RF channels in the selected seamless and partially seamless handoff tables based on number of common multiplexes and overall number of multiplexes in their respective LOIs; and
selecting the selected RF channel from the selected seamless and partially seamless handoff tables based on their ranking.

19. The method of claim 15, wherein said selecting comprises selecting the selected RF channel such that the selected RF channel meets a signal strength threshold and has a signal strength that is greater than a sum of signal strengths for a handoff_trigger_RF plus a hysteresis value.

20. The method of claim 15, further comprising determining that the handoff is successful if data associated with at least one desired media logical channel is successfully acquired.

21. The method of claim 15, further comprising determining that the handoff has failed based on at least one of a failure to acquire OIS, a failure to acquire a control channel, and a failure to acquire data associated with at least one desired media logical channel.

22. The method of claim 1, further comprising:
performing the handoff to acquire one or more activated flows;
determining that the handoff has failed;
deactivating the one or more activated flows; and
performing a system acquisition.

23. The method of claim 1, further comprising:
performing the handoff to acquire data for flows in at least one flow group from a list of flow groups, wherein each flow group is associated with one or more registered flows;
determining that the handoff has failed;
removing all flow groups carried on the current RF from the list of flow groups;
performing another handoff to acquire data for other flow groups if there are remaining flow groups in the list of flow groups;
resetting the list of flow groups to all flow groups if there are no remaining flow groups in the list of flow groups; and
scheduling monitoring of OIS to enable data acquisition for selected registered flows after a selected time interval.

24. An apparatus for radio frequency (RF) channel handoff in a multi-frequency network, the apparatus comprising:
processing logic configured to generate seamless handoff tables and partially seamless handoff tables for wide and local content multiplexes carried in a current group of local area transmitters, wherein the seamless and partially seamless handoff tables comprise neighboring RF channels carrying one or more of the wide and local content multiplexes as the current group of local area transmitters, and wherein said processing logic is configured further to detect a handoff event initiated by acquisition failures on a current RF channel and select one of the neighboring RF channels, from the seamless and partially seamless handoff tables, carrying at least the same wide and local content multiplexes as the current group of local area transmitters; and
channel switch logic configured to perform a handoff to the selected RF channel.

25. The apparatus of claim 24, wherein said processing logic is configured to generate a wide seamless handoff table for each wide multiplex in the current group of local area transmitters, wherein the wide seamless handoff table comprises neighboring RF channels that carry the respective wide multiplex and are associated with local operations infrastructures (LOIs) that carry an identical set of wide multiplexes as the current group of local area transmitters.

26. The apparatus of claim 24, wherein said processing logic is configured to generate a wide partially seamless handoff table for each wide multiplex in the current group of local area transmitters, wherein the wide partially seamless handoff table comprises neighboring RF channels that carry the respective wide multiplex and are associated with local operations infrastructures (LOIs) that do not carry an identical set of wide multiplexes as the current group of local area transmitters.

27. The apparatus of claim 24, wherein said processing logic is configured to detect the handoff event based on at least one of an acquisition failure for data associated with one or more activated flows, an acquisition failure for data associated with one or more registered flows, an acquisition failure for overhead information symbols (OIS) and an acquisition failure for a control channel (CC).

28. The apparatus of claim 24, wherein said processing logic is configured to detect the handoff event to comprise one of a wide handoff type if only wide flows are associated with acquisition failures, a local handoff type if only local flows are associated with acquisition failures, and a wide+local handoff type if both wide and local flows are associated with acquisition failures.

29. The apparatus of claim 28, wherein said processing logic is configured to select the selected RF from one of a wide seamless handoff table and a wide partially seamless handoff table associated with a wide multiplex on the current RF channel, if the handoff event comprises the wide handoff type.

30. The apparatus of claim 28, wherein said processing logic is configured to:
generate a handoff RF list by combining RF channels from selected seamless and partially seamless handoff tables associated with at least one selected multiplex on the current RF based on the handoff type; and
repeat the following operations until a successful handoff occurs:
select the selected RF channel from the handoff RF list;
perform a handoff to the selected RF channel;
determine that the handoff to the selected RF failed; and
remove the selected RF from the handoff RF list.

31. The apparatus of claim 30, wherein said processing logic is configured to select the selected RF channel from the selected seamless handoff table before the selected partially seamless handoff table.

32. The apparatus of claim 30, wherein said processing logic is configured to select the selected RF channel such that the selected RF channel meets a signal strength threshold and has a signal strength that is greater than a sum of signal strengths for a handoff_trigger_RF plus a hysteresis value.

33. An apparatus for radio frequency (RF) channel handoff in a multi-frequency network, the apparatus comprising:
means for generating seamless handoff tables and partially seamless handoff tables for wide and local content multiplexes carried in a current group of local area transmitters, wherein the seamless and partially seamless handoff tables comprise neighboring RF channels carrying one or more of the wide and local content multiplexes as the current group of local area transmitters;
means for detecting a handoff event initiated by acquisition failures on a current RF channel;
means for selecting one of the neighboring RF channels, from the seamless and partially seamless handoff tables, carrying at least the same wide and local content multiplexes as the current group of local area transmitters; and
means for performing a handoff to the selected RF channel.

34. The apparatus of claim 33, wherein said means for generating comprises means for generating a wide seamless handoff table for each wide multiplex in the current group of local area transmitters, wherein the wide seamless handoff table comprises neighboring RF channels that carry the respective wide multiplex and are associated with local operations infrastructures (LOIs) that carry an identical set of wide multiplexes as the current group of local area transmitters.

35. The apparatus of claim 33, wherein said means for generating comprises means for generating a wide partially seamless handoff table for each wide multiplex in the current group of local area transmitters, wherein the wide partially seamless handoff table comprises neighboring RF channels that carry the respective wide multiplex and are associated with local operations infrastructures (LOIs) that do not carry an identical set of wide multiplexes as the current group of local area transmitters.

36. The apparatus of claim 33, wherein said means for detecting comprises means for detecting the handoff event based on at least one of an acquisition failure for data associated with one or more activated flows, an acquisition failure for data associated with one or more registered flows, an acquisition failure for overhead information symbols (OIS) and an acquisition failure for a control channel (CC).

37. The apparatus of claim 33, wherein said means for detecting comprises means for detecting the handoff event to comprise one of a wide handoff type if only wide flows are associated with acquisition failures, a local handoff type if only local flows are associated with acquisition failures, and a wide+local handoff type if both wide and local flows are associated with acquisition failures.

38. The apparatus of claim 37, wherein said means for selecting comprises means for selecting the selected RF from one of a wide seamless handoff table and a wide partially seamless handoff table associated with a wide multiplex on the current RF channel, if the handoff event comprises the wide handoff type.

39. The apparatus of claim 37, further comprising:
means for generating a handoff RF list by combining RF channels from selected seamless and partially seamless handoff tables associated with at least one selected multiplex on the current RF based on the handoff type; and
means for repeating the following operations until a successful handoff occurs:
selecting the selected RF channel from the handoff RF list;
performing a handoff to the selected RF channel;
determining that the handoff to the selected RF failed; and
removing the selected RF from the handoff RF list.

40. The apparatus of claim 39, wherein said means for selecting comprises means for selecting the selected RF channel from the selected seamless handoff table before the selected partially seamless handoff table.

41. The apparatus of claim 39, wherein said means for selecting comprises means for selecting the selected RF channel such that the selected RF channel meets a signal strength threshold and has a signal strength that is greater than a sum of signal strengths for a handoff_trigger_RF plus a hysteresis value.

42. A computer program product for radio frequency (RF) channel handoff in a multi-frequency network, the computer program product comprising:
a machine-readable medium comprising:
a first set of codes for causing a computer to generate seamless handoff tables and partially seamless handoff tables for wide and local content multiplexes carried in a current group of local area transmitters, wherein the seamless and partially seamless handoff tables comprise neighboring RF channels carrying one or more of the wide and local content multiplexes as the current group of local area transmitters;
a second set of codes for causing the computer to detect a handoff event initiated by acquisition failures on a current RF channel;
a third set of codes for causing the computer to select one of the neighboring RF channels, from the seamless and partially seamless handoff tables, carrying at least the same wide and local content multiplexes as the current group of local area transmitters; and
a fourth set of codes for causing the computer to perform a handoff to the selected RF channel.

43. The machine-readable medium of claim 42, wherein said first set of codes are configured to cause the computer to generate a wide seamless handoff table for each wide multiplex in the current group of local area transmitters, wherein the wide seamless handoff table comprises neighboring RF channels that carry the respective wide multiplex and are associated with local operations infrastructures (LOIs) that carry an identical set of wide multiplexes as the current group of local area transmitters.

44. The machine-readable medium of claim 42, wherein said first set of codes are configured to cause the computer to generate a wide partially seamless handoff table for each wide multiplex in the current group of local area transmitters, wherein the wide partially seamless handoff table comprises neighboring RF channels that carry the respective wide multiplex and are associated with local operations infrastructures (LOIs) that do not carry an identical set of wide multiplexes as the current group of local area transmitters.

45. The machine-readable medium of claim 42, wherein said second set of codes are configured to cause the computer to detect the handoff event based on at least one of an acquisition failure for data associated with one or more activated flows, an acquisition failure for data associated with one or more registered flows, an acquisition failure for overhead information symbols (OIS) and an acquisition failure for a control channel (CC).

46. The machine-readable medium of claim 42, wherein said second set of codes are configured to cause the computer to detect the handoff event to comprise one of a wide handoff type if only wide flows are associated with acquisition failures, a local handoff type if only local flows are associated with acquisition failures, and a wide+local handoff type if both wide and local flows are associated with acquisition failures.

47. The machine-readable medium of claim 46, wherein said third set of codes are configured to cause the computer to select the selected RF from one of a wide seamless handoff table and a wide partially seamless handoff table associated with a wide multiplex on the current RF channel, if the handoff event comprises the wide handoff type.

48. The machine-readable medium of claim 46, further comprising:
a fifth set of codes configured to cause the computer to generate a handoff RF list by combining RF channels from selected seamless and partially seamless handoff tables associated with at least one selected multiplex on the current RF based on the handoff type; and
a sixth set of codes configured to cause the computer to repeat the following operations until a successful handoff occurs:
select the selected RF channel from the handoff RF list;
perform a handoff to the selected RF channel;
determine that the handoff to the selected RF failed; and
remove the selected RF from the handoff RF list.

49. The machine-readable medium of claim 48, wherein said third set of codes are configured to cause the computer to select the selected RF channel from the selected seamless handoff table before the selected partially seamless handoff table.

50. The machine-readable medium of claim 48, wherein said third set of codes are configured to cause the computer to select the selected RF channel such that the selected RF channel meets a signal strength threshold and has a signal strength that is greater than a sum of signal strength for a handoff_trigger_RF plus a hysteresis value.

51. At least one integrated circuit configured for radio frequency (RF) channel handoff in a multi-frequency network, the at least one integrated circuit comprising:
a first module configured to generate seamless handoff tables and partially seamless handoff tables for wide and local content multiplexes carried in a current group of local area transmitters, wherein the seamless and partially seamless handoff tables comprise neighboring RF channels carrying one or more of the wide and local content multiplexes as the current group of local area transmitters;

a second module configured to detect a handoff event initiated by acquisition failures on a current RF channel;

a third module configured to select a selected RF channel from the seamless and partially seamless handoff tables; and a fourth module configured to perform a handoff to the selected RF channel.

52. The at least one integrated circuit of claim 51, wherein said first module is configured to generate a wide seamless handoff table for each wide multiplex in the current group of local area transmitters, wherein the wide seamless handoff table comprises neighboring RF channels that carry the respective wide multiplex and are associated with local operations infrastructures (LOIs) that carry an identical set of wide multiplexes as the current group of local area transmitters.

53. The at least one integrated circuit of claim 51, wherein said first module is configured to generate a wide partially seamless handoff table for each wide multiplex in the current group of local area transmitters, wherein the wide partially seamless handoff table comprises neighboring RF channels that carry the respective wide multiplex and are associated with local operations infrastructures (LOIs) that do not carry an identical set of wide multiplexes as the current group of local area transmitters.

54. The at least one integrated circuit of claim 51, wherein said second module is configured to detect the handoff event based on at least one of an acquisition failure for data associated with one or more activated flows, an acquisition failure for data associated with one or more registered flows, an acquisition failure for overhead information symbols (OIS) and an acquisition failure for a control channel (CC).

55. The at least one integrated circuit of claim 51, wherein said second module is configured to detect the handoff event to comprise one of a wide handoff type if only wide flows are associated with acquisition failures, a local handoff type if only local flows are associated with acquisition failures, and a wide+local handoff type if both wide and local flows are associated with acquisition failures.

56. The at least one integrated circuit of claim 55, wherein said third module is configured to select the selected RF from one of a wide seamless handoff table and a wide partially seamless handoff table associated with a wide multiplex on the current RF channel, if the handoff event comprises the wide handoff type.

57. The at least one integrated circuit of claim 55, further comprising:

a fifth module configured to generate a handoff RF list by combining RF channels from selected seamless and partially seamless handoff tables associated with at least one selected multiplex on the current RF based on the handoff type; and a sixth module configured to repeat the following operations until a successful handoff occurs:
select the selected RF channel from the handoff RF list;
perform a handoff to the selected RF channel;
determine that the handoff to the selected RF failed; and
remove the selected RF from the handoff RF list.

58. The at least one integrated circuit of claim 57, wherein said third module is configured to select the selected RF channel from the selected seamless handoff table before the selected partially seamless handoff table.

59. The at least one integrated circuit of claim 57, wherein said third module is configured to select the selected RF channel such that the selected RF channel meets a signal strength threshold and has a signal strength that is greater than a sum of signal strengths for a handoff_trigger_RF plus a hysteresis value.

* * * * *